United States Patent
Matsumura et al.

(10) Patent No.: US 9,632,950 B2
(45) Date of Patent: Apr. 25, 2017

(54) STORAGE CONTROL DEVICE CONTROLLING ACCESS TO A STORAGE DEVICE AND ACCESS CONTROLLING METHOD OF A STORAGE DEVICE

(71) Applicant: FUJITSU LIMITED, Kawasaki-shi, Kanagawa (JP)

(72) Inventors: Shinichiro Matsumura, Kawasaki (JP); Akihito Kobayashi, Kawasaki (JP); Motohiro Sakai, Nerima (JP); Takahiro Ohyama, Kawasaki (JP); Takuro Kumabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 105 days.

(21) Appl. No.: 14/753,696

(22) Filed: Jun. 29, 2015

(65) Prior Publication Data

US 2016/0062915 A1 Mar. 3, 2016

(30) Foreign Application Priority Data

Sep. 1, 2014 (JP) .................................. 2014-177273

(51) Int. Cl.
*G06F 12/12* (2016.01)
*G06F 12/122* (2016.01)
(Continued)

(52) U.S. Cl.
CPC ........ *G06F 12/122* (2013.01); *G06F 12/0811* (2013.01); *G06F 12/0817* (2013.01);
(Continued)

(58) Field of Classification Search
CPC .... G06F 12/122; G06F 12/12; G06F 12/0817; G06F 12/0811; G06F 12/128; G06F 2212/69; G06F 2212/283
See application file for complete search history.

(56) References Cited

U.S. PATENT DOCUMENTS

2005/0240724 A1 10/2005 Koizumi et al.
2005/0289318 A1 12/2005 Mori et al.
2007/0079064 A1 4/2007 Kobayashi et al.

FOREIGN PATENT DOCUMENTS

JP 2005-309739 11/2005
JP 2006-11803 1/2006
(Continued)

OTHER PUBLICATIONS

R. Kayne, "What is L2 Cache?", Feb. 19, 2009, wiseGEEK. Retrieved on Dec. 7, 2016 from <http://web.archive.org/web/20090218152849/http://wisegeek.com/what-is-l2-cache.htm>.*

*Primary Examiner* — Arpan P. Savla
(74) *Attorney, Agent, or Firm* — Staas & Halsey LLP

(57) ABSTRACT

An apparatus includes a first cache memory, a second cache memory, and a processor coupled to the first cache memory and the second cache memory, and configured to store data in the second cache memory, the data being deleted from the first cache memory, store first data stored in a first address of the storage device, in the second cache memory, in case where the first address is included in first management information and is not included in second management information, according to a request for access to the first address of the storage device, the first management information including an address in the storage device of specific data stored in the storage device, and the second management information including an address in the storage device of data stored in both of the second cache memory and the storage device, and register the first address in the second management information.

16 Claims, 17 Drawing Sheets

(51) Int. Cl.
  *G06F 12/0811* (2016.01)
  *G06F 12/128* (2016.01)
  *G06F 12/0817* (2016.01)

(52) U.S. Cl.
  CPC ............ *G06F 12/12* (2013.01); *G06F 12/128* (2013.01); *G06F 2212/283* (2013.01); *G06F 2212/69* (2013.01)

(56) References Cited

FOREIGN PATENT DOCUMENTS

| | | |
|---|---|---|
| JP | 2007-102314 | 4/2007 |
| JP | 2014-10604 | 1/2014 |

\* cited by examiner

FIG. 4

| LUN | LBA | NUMBER OF TIMES OF EVICTION | |
|---|---|---|---|
| A | 0x1000 | 1 | ～ 401-1 |
| D | 0x2000 | 2 | ～ 401-2 |
| B | 0x2000 | 1 | ～ 401-3 |
| ... | ... | ... | |

| LUN | STARTING LBA | ENDING LBA | |
|---|---|---|---|
| A | 0x3000 | 0x3600 | 601-1 |
| D | 0x3000 | 0x3200 | 601-2 |
| B | 0x1000 | 0x2000 | 601-3 |
| ... | ... | ... | |

| LUN | LBA | NUMBER OF TIMES OF ACCESS | |
|---|---|---|---|
| A | 0x3000 | 3 | ~ 701-1 |
| D | 0x3000 | 4 | ~ 701-2 |
| A | 0x3200 | 2 | ~ 701-3 |
| ... | ... | ... | |

FIG. 14A

| SCT | | | SBE | | BCT | | | BCE | | |
|---|---|---|---|---|---|---|---|---|---|---|
| LUN | LBA | NUMBER OF TIMES OF EVICTION | LUN | LBA | LUN | STARTING LBA | ENDING LBA | LUN | LBA | NUMBER OF TIMES OF ACCESS |
| | | | | | D | 0x6000 | 0x7000 | | | |
| | | | | | A | 0x3000 | 0x3800 | | | |

FIG. 14B

| SCT | | | SBE | | BCT | | | BCE | | |
|---|---|---|---|---|---|---|---|---|---|---|
| LUN | LBA | NUMBER OF TIMES OF EVICTION | LUN | LBA | LUN | STARTING LBA | ENDING LBA | LUN | LBA | NUMBER OF TIMES OF ACCESS |
| | | | | | D | 0x6000 | 0x7000 | A | 0x3000 | 1 |
| | | | | | A | 0x3000 | 0x3800 | | | |

FIG. 14C

| SCT | | | SBE | | BCT | | | BCE | | |
|---|---|---|---|---|---|---|---|---|---|---|
| LUN | LBA | NUMBER OF TIMES OF EVICTION | LUN | LBA | LUN | STARTING LBA | ENDING LBA | LUN | LBA | NUMBER OF TIMES OF ACCESS |
| B | 0x1800 | 1 | | | D | 0x6000 | 0x7000 | A | 0x3000 | 1 |
| | | | | | A | 0x3000 | 0x3800 | | | |

FIG. 14D

| SCT | | | SBE | | BCT | | | BCE | | |
|---|---|---|---|---|---|---|---|---|---|---|
| LUN | LBA | NUMBER OF TIMES OF EVICTION | LUN | LBA | LUN | STARTING LBA | ENDING LBA | LUN | LBA | NUMBER OF TIMES OF ACCESS |
| B | 0x1800 | 2 | | | D | 0x6000 | 0x7000 | A | 0x3000 | 1 |
| | | | | | A | 0x3000 | 0x3800 | | | |
| | | | | | | | | | | |
| | | | | | | | | | | |

FIG. 14E

| SCT | | | SBE | | BCT | | | BCE | | |
|---|---|---|---|---|---|---|---|---|---|---|
| LUN | LBA | NUMBER OF TIMES OF EVICTION | LUN | LBA | LUN | STARTING LBA | ENDING LBA | LUN | LBA | NUMBER OF TIMES OF ACCESS |
| B | 0x1800 | 2 | | | D | 0x6000 | 0x7000 | A | 0x3000 | 1 |
| C | 0x3000 | 3 | | | A | 0x3000 | 0x3800 | | | |
| A | 0x2800 | 4 | | | | | | | | |
| D | 0x8000 | 2 | | | | | | | | |

FIG. 15A

| SCT | | | SBE | | BCT | | | BCE | | |
|---|---|---|---|---|---|---|---|---|---|---|
| LUN | LBA | NUMBER OF TIMES OF EVICTION | LUN | LBA | LUN | STARTING LBA | ENDING LBA | LUN | LBA | NUMBER OF TIMES OF ACCESS |
| C | 0x3000 | 3 | | | D | 0x6000 | 0x7000 | A | 0x3000 | 1 |
| A | 0x2800 | 4 | | | A | 0x3000 | 0x3800 | | | |
| D | 0x8000 | 2 | | | | | | | | |
| D | 0x8800 | 1 | | | | | | | | |

FIG. 15B

| SCT | | | SBE | | BCT | | | BCE | | |
|---|---|---|---|---|---|---|---|---|---|---|
| LUN | LBA | NUMBER OF TIMES OF EVICTION | LUN | LBA | LUN | STARTING LBA | ENDING LBA | LUN | LBA | NUMBER OF TIMES OF ACCESS |
| C | 0x3000 | 3 | A | 0x2800 | D | 0x6000 | 0x7000 | A | 0x3000 | 1 |
| D | 0x8000 | 2 | | | A | 0x3000 | 0x3800 | | | |
| D | 0x8800 | 1 | | | | | | | | |
| | | | | | | | | | | |

FIG. 15C

| SCT | | | SBE | | BCT | | | BCE | | |
|---|---|---|---|---|---|---|---|---|---|---|
| LUN | LBA | NUMBER OF TIMES OF EVICTION | LUN | LBA | LUN | STARTING LBA | ENDING LBA | LUN | LBA | NUMBER OF TIMES OF ACCESS |
| A | 0x1800 | 1 | A | 0x2800 | D | 0x6000 | 0x7000 | A | 0x3000 | 2 |
| D | 0x3000 | 2 | B | 0x1800 | A | 0x3000 | 0x3800 | D | 0x6000 | 4 |
| B | 0x8000 | 2 | C | 0x3000 | C | 0x2000 | 0x2800 | D | 0x6800 | 3 |
| B | 0x2000 | 1 | D | 0x8000 | | | | C | 0x2000 | 1 |

FIG. 15D

| SCT | | | SBE | | BCT | | | BCE | | |
|---|---|---|---|---|---|---|---|---|---|---|
| LUN | LBA | NUMBER OF TIMES OF EVICTION | LUN | LBA | LUN | STARTING LBA | ENDING LBA | LUN | LBA | NUMBER OF TIMES OF ACCESS |
| A | 0x1800 | 1 | A | 0x2800 | D | 0x6000 | 0x7000 | A | 0x3000 | 2 |
| D | 0x3000 | 2 | B | 0x1800 | A | 0x3000 | 0x3800 | D | 0x6800 | 3 |
| B | 0x8000 | 2 | C | 0x3000 | C | 0x2000 | 0x2800 | C | 0x2000 | 1 |
| B | 0x2000 | 1 | D | 0x8000 | | | | D | 0x6000 | 5 |

FIG. 16A

| SCT | | | SBE | | BCT | | | BCE | | |
|---|---|---|---|---|---|---|---|---|---|---|
| LUN | LBA | NUMBER OF TIMES OF EVICTION | LUN | LBA | LUN | STARTING LBA | ENDING LBA | LUN | LBA | NUMBER OF TIMES OF ACCESS |
| A | 0x1800 | 1 | B | 0x1800 | D | 0x6000 | 0x7000 | A | 0x3000 | 2 |
| D | 0x3000 | 2 | C | 0x3000 | A | 0x3000 | 0x3800 | D | 0x6800 | 3 |
| B | 0x8000 | 2 | D | 0x8000 | C | 0x2000 | 0x2800 | C | 0x2000 | 1 |
| B | 0x2000 | 1 | A | 0x2800 | | | | D | 0x6000 | 5 |

FIG. 16B

| SCT | | | SBE | | BCT | | | BCE | | |
|---|---|---|---|---|---|---|---|---|---|---|
| LUN | LBA | NUMBER OF TIMES OF EVICTION | LUN | LBA | LUN | STARTING LBA | ENDING LBA | LUN | LBA | NUMBER OF TIMES OF ACCESS |
| A | 0x1800 | 1 | B | 0x1800 | D | 0x6000 | 0x7000 | A | 0x3000 | 2 |
| D | 0x3000 | 3 | C | 0x3000 | A | 0x3000 | 0x3800 | D | 0x6800 | 3 |
| B | 0x8000 | 2 | D | 0x8000 | C | 0x2000 | 0x2800 | C | 0x2000 | 1 |
| B | 0x2000 | 1 | A | 0x2800 | | | | D | 0x6000 | 5 |

FIG. 16C

| SCT | | | SBE | | BCT | | | BCE | | |
|---|---|---|---|---|---|---|---|---|---|---|
| LUN | LBA | NUMBER OF TIMES OF EVICTION | LUN | LBA | LUN | STARTING LBA | ENDING LBA | LUN | LBA | NUMBER OF TIMES OF ACCESS |
| A | 0x1800 | 1 | B | 0x1800 | D | 0x6000 | 0x7000 | D | 0x6800 | 3 |
| D | 0x3000 | 3 | C | 0x3000 | A | 0x3000 | 0x3800 | C | 0x2000 | 1 |
| B | 0x8000 | 2 | D | 0x8000 | C | 0x2000 | 0x2800 | D | 0x6000 | 5 |
| B | 0x2000 | 1 | A | 0x2800 | | | | A | 0x3600 | 1 |

FIG. 16D

| SCT | | | SBE | | BCT | | | BCE | | |
|---|---|---|---|---|---|---|---|---|---|---|
| LUN | LBA | NUMBER OF TIMES OF EVICTION | LUN | LBA | LUN | STARTING LBA | ENDING LBA | LUN | LBA | NUMBER OF TIMES OF ACCESS |
| A | 0x1800 | 1 | C | 0x3000 | D | 0x6000 | 0x7000 | C | 0x2000 | 1 |
| D | 0x3000 | 3 | D | 0x8000 | A | 0x3000 | 0x3800 | D | 0x6000 | 5 |
| B | 0x8000 | 2 | A | 0x2800 | C | 0x2000 | 0x2800 | A | 0x3600 | 1 |
| B | 0x2000 | 1 | C | 0x2200 | | | | D | 0x6800 | 1 |

STORAGE CONTROL DEVICE CONTROLLING ACCESS TO A STORAGE DEVICE AND ACCESS CONTROLLING METHOD OF A STORAGE DEVICE

CROSS-REFERENCE TO RELATED APPLICATION

This application is based upon and claims the benefit of priority of the prior Japanese Patent Application No. 2014-177273, filed on Sep. 1, 2014, the entire contents of which are incorporated herein by reference.

FIELD

The embodiment discussed herein is related to a storage control device and a storage control method.

BACKGROUND

For a storage device, there is a technology in the related art that increases response performance for a request for access to data that is frequently accessed, by temporarily retaining data read from a disk according to an access request from a host in a cache memory.

As a related technology in the related art, for example, there is a technology that instructs a data set designated by a user to reside in a cache by referring to catalog information that manages the data set that is stored in a logical volume. Furthermore, there is a technology that processes data at high speed by allocating an area of the logical volume in advance to a specific area of the cache and thus causing the data for the specific area, which is to be processed, to reside in the cache at all times. Furthermore, there is a technology that controls whether or not data relating to the job within the cache is caused to reside, based on cache residence information that is issued in association with a job that is processed in a server. Furthermore, there is a technology that enables a storage device to include a storage medium, a higher-middle storage function, and a lower-middle function. Related techniques are disclosed in, for example, Japanese Laid-open Patent Publication Nos. 2006-11803, 2007-102314, 2005-309739, and 2014-10604.

SUMMARY

According to an aspect of the invention, an apparatus includes a first cache memory, a second cache memory, and a processor coupled to the first cache memory and the second cache memory, and configured to store data in the second cache memory, the data being deleted from the first cache memory, store first data stored in a first address of the storage device, in the second cache memory, in a case where the first address is included in first management information and is not included in second management information, according to a request for access to the first address of the storage device, the first management information including an address in the storage device of specific data stored in the storage device, and the second management information including an address in the storage device of data stored in both of the second cache memory and the storage device, and register the first address in the second management information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating one example of contents that are stored in an access address candidate list (SCT);

FIG. 6 is a diagram illustrating one example of contents that are stored in a bind cache table (BCT);

FIG. 7 is a diagram illustrating one example of contents that are in a bind cache control table (BCE);

FIGS. 14A to 14E are diagrams (which correspond to the first portion) illustrating one example of I/O processing by the storage control device according to the present embodiment;

FIGS. 15A to 15D are diagrams (which correspond to the second portion) illustrating one example of I/O processing by the storage control device according to the present embodiment; and FIGS. 16A to 16D are diagrams (which correspond to the third portion) illustrating one example of I/O processing by the storage control device according to the present embodiment.

DESCRIPTION OF EMBODIMENT

In the related art, in some cases, although data is frequently accessed, response performance for an access request is low. For example, in a case where data designated by a user is made to reside in a cache, because a region for retaining data other than the data designated by the user is decreased in size, data is difficult to retain, although frequently accessed, in the cache, thereby decreasing the response performance.

An object of an aspect of the present embodiment is to provide a storage control device and a storage control program that attempt improvement in the response performance for the data access.

According to one aspect of the present embodiment, an effect of making it possible to achieve the improvement in the response performance for the data access is accomplished.

The storage control device and the storage control program according to an embodiment of the present embodiment will be described in detail below referring to the following drawings.

Embodiment

Figure 1:
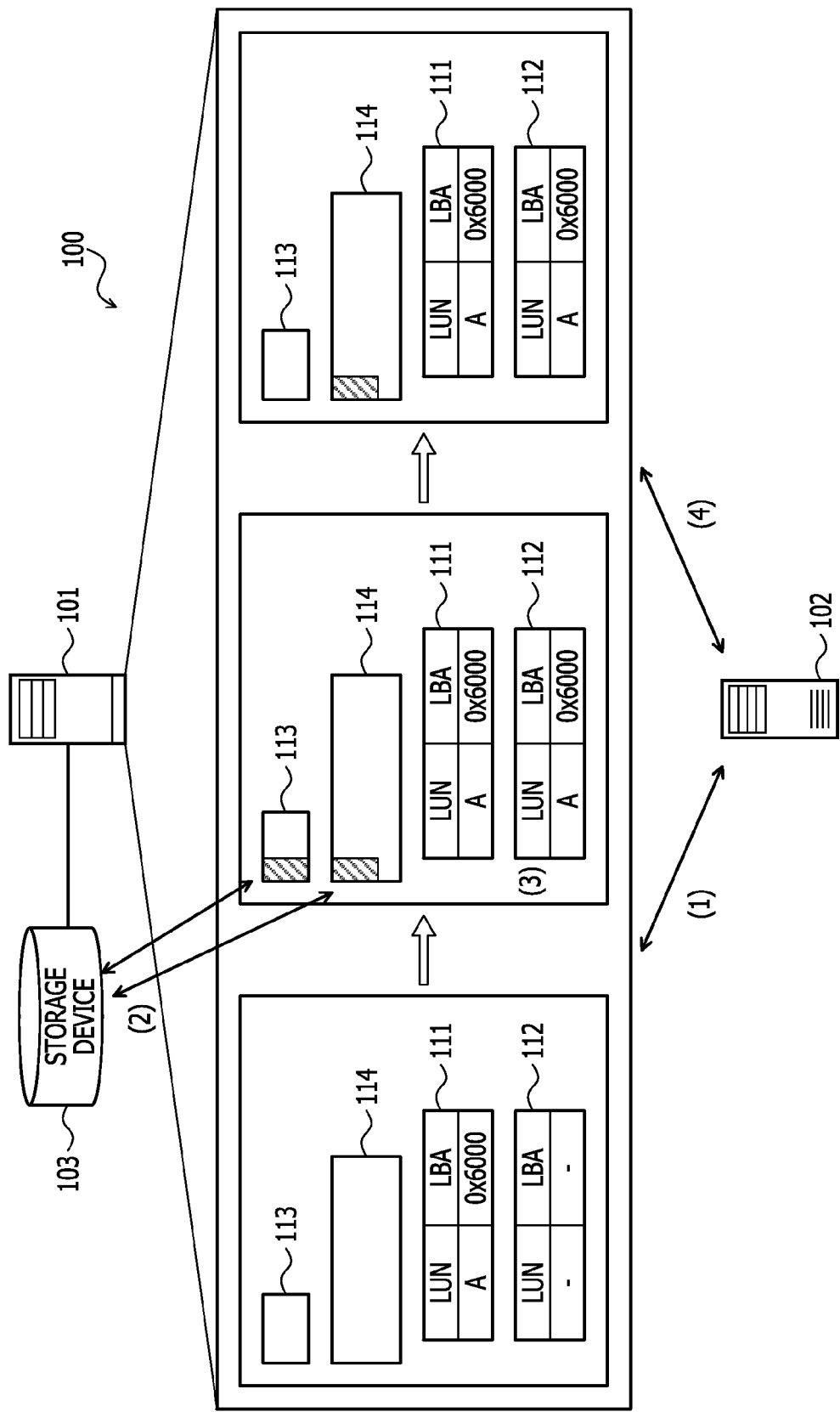
FIG. 1 is a diagram illustrating one example of a storage device according to an embodiment.

FIG. 1 is a diagram of one example of a storage control device 101 according to an embodiment of the present embodiment. In FIG. 1, a storage system 100 includes a storage control device 101 and a storage device 103.

The storage control device 101 has a first cache 113 and a second cache 114 and is a control device that is accessible to the storage device 103. The storage control device 101 receives a request for access to the storage device 103 from a host apparatus 102, and responds to the request for access with data that is retained a first cache 113, a second cache 114, or a storage device 103. For example, the storage control device 101 is coupled to the host apparatus 102 with a fiber channel cable, Ethernet (a registered trade mark), or the like.

The access request is a request to write data to the storage device 103 or a request to read data from the storage device 103. In a case where the access request is the request to write data, a response to the access request is to write data to any one of the first cache 113, the second cache 114, and the storage device 103. Furthermore, in a case where the access request is the request to read data, the response to the access request is to read data from any one the first cache 113, the second cache 114, and the storage device 103 and transmit the resulting data to the host apparatus 102.

The host apparatus 102 is a computer such as a personal computer (PC) or a server. The storage device 103 stores data that is used by the host apparatus 102. The storage device 103 may be a physical volume and may be a logical volume. The physical volume may correspond to one hard disk, and may correspond to a partition within a hard disk. The logical volume results from logically partitioning a volume group that results from putting physical volumes together.

At this point, as the identifier for identifying the logical volume, a logical unit number (LUN) can be used. Furthermore, a storage area of the logical volume is specified, for example, by logical block addressing (LBA). LBA is a scheme by which a sequence number is assigned to the storage area within the logical volume and the storage area is specified by the sequence number.

The first cache 113 is a high-speed small-capacity memory, and has a function of retaining data of the storage device 103. For example, the first cache 113 is a dynamic random access memory (DRAM).

The second cache 114 is a memory that runs at a lower speed and has a higher capacity than the first cache 113 and runs at a higher speed and has a lower capacity than the storage device 103, and has a function of retaining the data of the storage device 103. For example, the second cache 114 is a flash memory.

At this point, as a method in which the second cache is used by an existing storage control device, there is a method in which data that is evicted from the first cache is retained in the second cache. For example, the storage control device stores an address on the storage device, of the data evicted from the first cache, and the number of times that the data has been evicted from the first cache. In a case where the number of times that the data has been evicted from the first cache exceeds a threshold, the storage control device retains the data evicted from the first cache in the second cache.

Because the second cache runs at a higher speed than the storage device, in a case where the request for access to the data retained in the second cache arrives again, the storage control device can respond to the access request at high speed by responding with the data in the second cache.

However, in the case where the number of times that the data has been evicted from the first cache exceeds a threshold, the storage control device retains the data evicted from the first cache in the second cache. For this reason, the data evicted from the first cache is not retained immediately in the second cache. Accordingly, in some cases, if the data, although frequently used, is retained in the second cache, it is difficult for the storage control device to respond to the request for access to the data that is frequently used, at high speed.

Furthermore, the storage control device can set a threshold to be low, and thus can immediately retain the data evicted from the first cache in the second cache. However, in a case where the request from a host apparatus for access to a large amount of data is present and the large amount of data is evicted from the first cache, the large amount of data is retained in the second cache. Because there is a limitation on a capacity of the second cache, in some cases, the data that is used more frequently than a large amount of data is not retained in the second cache. Accordingly, in some cases, if the data, although frequently used, is not retained in the second cache, it is difficult for the storage control device to respond to the request for access to the data that is frequently used, at high speed.

Therefore, according to the present embodiment, the storage control device 101 stores in first management information 111 an address of data that is retained in the second cache 114. With a request for access to the address, the storage control device 101 retains the data at the address in the second cache 114, and registers the address of the data in second management information 112.

Accordingly, the storage control device 101 can respond to the request for access to the data at the address registered in the second management information 112 with the data retained in the second cache 114. For this reason, the storage control device 101 can improve the response performance for the data that is designated by the user and that is frequently used without using the first cache 113, by registering in the first management information 111 the address of the data that is frequently used by the user.

One example of the storage control device 101 according to the embodiment will be described below.

(1) The storage control device 101 receives a request for access to any storage area of the storage device 103 from the host apparatus 102. The storage control device 101 stores the first management information 111 that includes an address on the storage device 103, of the data that is retained in the second cache 114, and the second management information 112 that includes the address on the storage device 103, of the data that is retained in the second cache 114.

At this point, the address of the storage area, the request for access to which is received is included in the first management information 111, and is not included in the second management information 112. The address is information by which the storage area on the storage device 103 is specified. For example, the address includes the LUN by which the logical volume is identified and the LBA by which a storage location of the data within the logical volume is specified.

In an example in FIG. 1, an address on the storage device 103 which says that the LUN is A and the LBA is 0x6000, is included in the first management information 111, and the address on the storage device 103, which says that the LUN is A and that the LBA is 0x6000, is not included in the second management information 112. In this state, the storage control device 101 receives from the host apparatus 102 the request for access to a storage area of which the LUN is A and of which the LBA is 0x6000. At this point, 0x6000 indicates that a numerical value that is equal to or less than 0x is a numerical value in hexadecimal notation.

(2) The storage control device 101 retains data in the storage area, a request from the host apparatus 102 for access to which is present, in the first cache 113 and the second cache 114.

In a case where the access request is a request for reading, the storage control device 101 reads the data in the storage area, the request for access to which is present, from the storage device 103. The storage control device 101 retains the data, which is read, in the first cache 113 and the second cache 114.

Furthermore, in a case where the access request is a request for writing, the storage control device 101 retains the data in the storage area, the request for access to which is present, in the first cache 113 and the second cache 114. The storage control device 101 writes the data in the storage area, the request for access to which is present to the storage device 103.

In the example in FIG. 1, the storage control device 101 retains in the first cache 113 and the second cache 114 the data in the storage area of which the LUN is A and of which the LBA is 0x6000.

(3) The storage control device 101 registers the address of the storage area, the request from the host apparatus 102 for access to which is present, in the second management information 112.

In the example in FIG. 1, the storage control device 101 registers in the second management information 112 the address of the storage area of which the LUN is A and of which the LBA is 0x6000.

(4) The storage control device 101 receives a request for access to any storage area of the storage device 103 from the host apparatus 102. At this point, the address of the storage area, the request for access to which is received, is included in the second management information 112. For this reason, the data in the storage area is retained in the second cache 114.

In a case where the access request is the request for reading, the storage control device 101 responds to the access request by reading the data retained in the second cache 114 and transmitting the data, which is read, to the host apparatus 102.

Furthermore, in a case where the access request is the request for writing, the storage control device 101 responds to the access request by retaining the data in the storage area, the request for access to which is present, in the second cache 114.

In the example in FIG. 1, in a case where the access request is the request for reading, the storage control device 101 responds to the access request by reading the data in the storage area of which the LUN is A and of which the LBA is 0x6000, which is stored in the second cache 114, and transmitting the data, which is read, to the host apparatus 102. Furthermore, in the case where the access request is the request for writing, the storage control device 101 responds to the access request by retaining the data in the storage area in the second cache 114, the request for access to which is present, of which the LUN is A and of which the LBA is 0x6000.

In a case where the data in the storage area, the request for access to which is received, is retained in the first cache 113, the storage control device 101 may respond to the access request with the data retained in the first cache 113. Furthermore, the storage control device 101 transfers the data retained in the second cache 114 to the first cache 113 and may respond to the host apparatus 102 with the transferred data of the first cache 113.

As described above, the storage control device 101 stores in the first management information 111 the address on the storage device 103, of the data that is retained in the second cache 114, and stores in the second management information 112 the address on the storage device 103, of the data that is retained in the second cache 114. According to the request for access to data at an address that is included in the first management information 111, but is not included in the second management information 112, the storage control device 101 retains the data in the second cache 114 and registers the address of the data in the second management information 112.

Accordingly, with a first access request, the storage control device 101 can retain the data designated by the user in the second cache 114 by registering the address of the data designated by the user in the first management information 111. Therefore, the storage control device 101 can handle the request for access to the data designated by the user with the data retained in the second cache 114. For this reason, the storage control device 101 can immediately switch to a state where the data designated by the user can be accessed at high speed without using the first cache 113, and thus can improve the response performance for the data designated by the user.

Furthermore, with a first access request, the storage control device 101 can retain data that is frequently used, in the second cache 114, by registering in the first management information 111 the address of the data that is frequently used. Therefore, the storage control device 101 can handle the request for access to the data that is frequently used, with the data retained in the second cache 114. For this reason, the storage control device 101 can immediately switch to a state where the data that is frequently used can be accessed at high speed without using the first cache 113, and thus can improve the response performance for the data that is frequently used.

Furthermore, with a first access request, the storage control device 101 can retain data that has to be accessed at high speed, such as a control table, in the second cache 114, by registering in the first management information 111 the address of the data that has to be accessed at high speed, such as the control table. Therefore, the storage control device 101 can handle the request for access to the data that has to be accessed at high speed, such as the control table, with the data retained in the second cache 114. For this reason, the storage control device 101 can immediately switch to a state where the data that has to be accessed at high speed, such as the control table, can be accessed at high speed, without using the first cache 113, and thus can improve the response performance for the data that has to be accessed at high speed, such as the control table.

(Example of a System Configuration of the Storage System 100)

Figure 2:
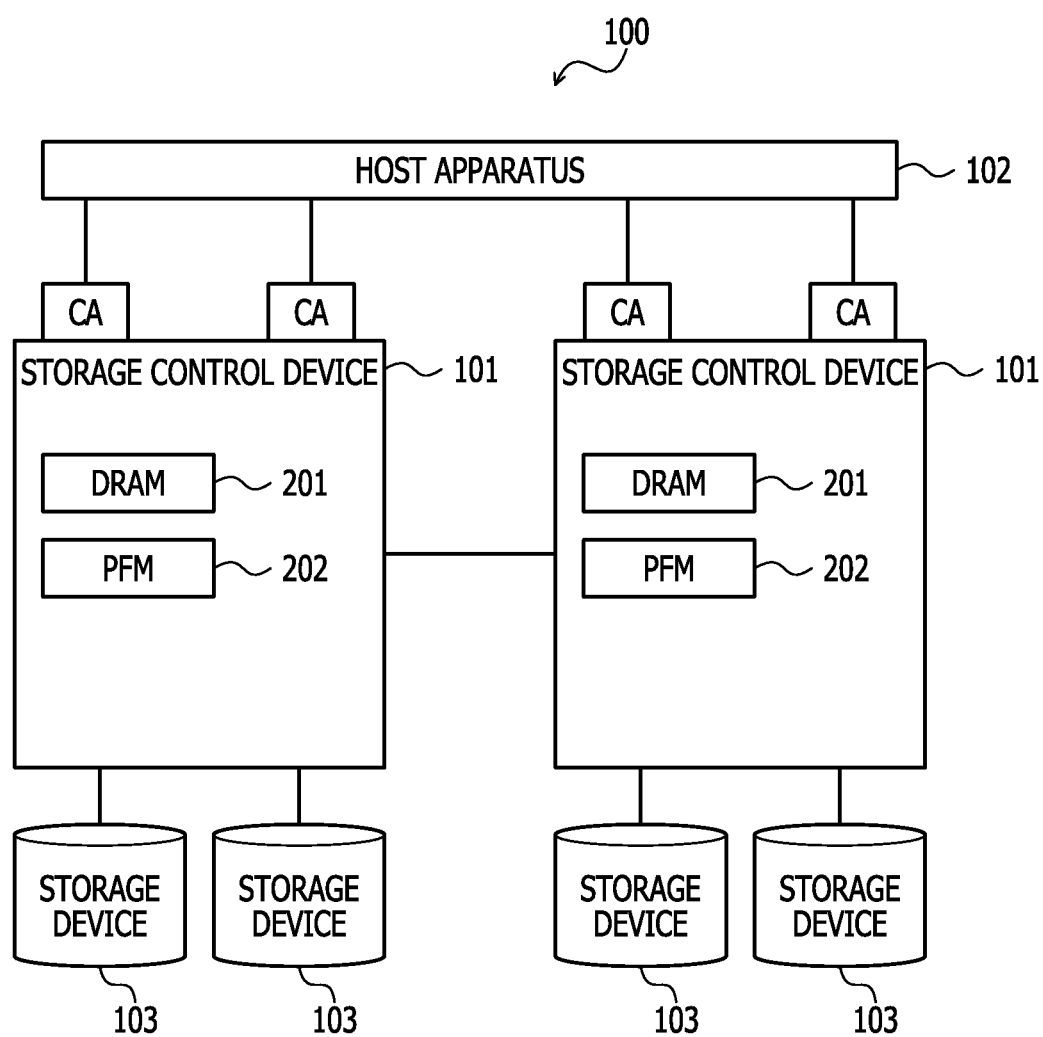
FIG. 2 is a diagram illustrating an example of a system configuration of a storage system according to the embodiment.

FIG. 2 is a diagram illustrating an example of a system configuration of the storage system 100 according to the embodiment. In FIG. 2, the storage system 100 includes the storage control device 101, the host apparatus 102, and the storage device 103.

The storage control device 101 is a device that controls the storage device 103. The storage control device 101 includes a DRAM 201, a PCIe flash module (PFM) 202, and a CA. The DRAM 201 is the first cache of the storage control device 101. The PFM 202 is the second cache of the storage control device 101. Specifically, the PFM 202 is a high-speed high-capacity solid state drive (SSD) that is coupled to a peripheral component interconnect express (PCIe) bus. The CA is a device that is coupled to the host apparatus 102.

The host apparatus 102 is a computer, for example, such as a server or a PC, which has access to the storage control device 101. The storage device 103 is a device in which data is stored. For example, the storage device 103 is a storage device such as a hard disk drive or a disk array device.

(Example of a Hardware Configuration of the Storage Control Device 101)

Figure 3:
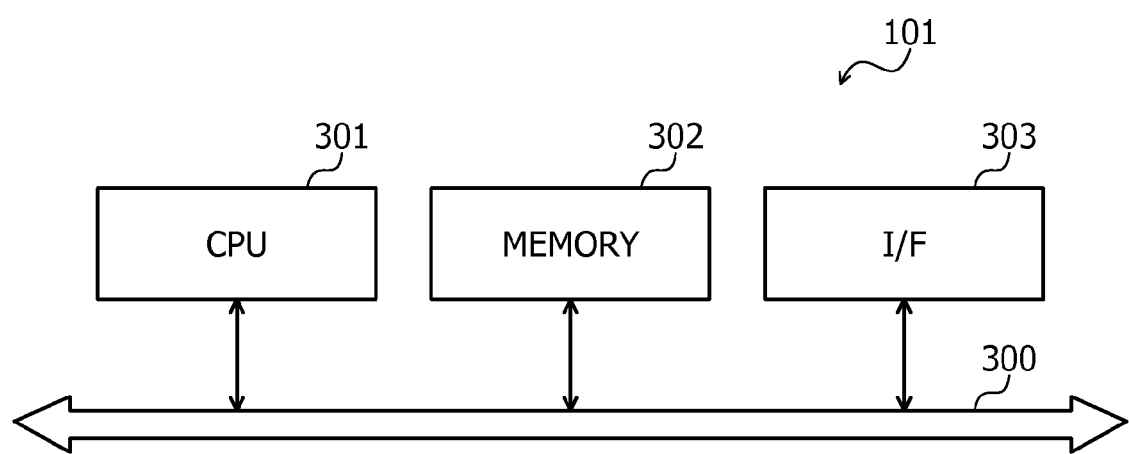
FIG. 3 is a block diagram illustrating an example of a hardware configuration of a storage control device according to the embodiment.

FIG. 3 is a block diagram illustrating an example of a hardware configuration of the storage control device 101 according to the embodiment. In FIG. 3, the storage control device 101 has a CPU 301, a memory 302, and an interface (I/F) 303. Furthermore, each configuration component is coupled to a bus 300.

At this point, the CPU 301 manages control of the entire storage control device 101. The memories 302 include, for example, a read-only memory (ROM), a random access memory (RAM), a flash ROM, and the like. Specifically, for example, various programs are stored in the flash ROM or ROM, and the RAM as a storage unit, is used as a work area for the CPU 301. A program that is stored in the memory 302 is loaded onto the CPU 301 and thus causes the CPU 301 to perform coded processing. Furthermore, the memories 302 include the DRAM 201 and the PFM 202.

The I/F 303 is a device that is coupled to the host apparatus 102 and the storage device 103. The I/F 303 includes the CA.

(One Example of an Access Address Candidate List 401)

FIG. 4 is a diagram illustrating one example of contents that are stored in an access address candidate list (SCT) 401. In FIG. 4, for example, an access address candidate list 401 is created or updated by the storage control device 101, and is stored in the memory 302 of the storage control device 101.

The access address candidate list 401 has such items as the LUN, the LBA, and the number of times of eviction. Access address candidate information (for example, pieces of access address candidate information 401-1 to 401-3) is stored as a record in the access address candidate list 401 by setting information to be in each item.

At this point, the LUN is an identifier for identifying the logical volume of the storage device 103. The LBA is information by which a storage area within the logical volume is specified. The number of times of eviction indicates the number of times that the data, which is stored in a predetermined range of distance from the storage area that is specified by the LBA in the logical volume that is identified by the LUN, is evicted from the first cache. The predetermined range is, for example, 0x200.

In an example in FIG. 4, a record 401-1 indicates that data, which is stored in a predetermined range of distance from LBA 0x1000 in the logical volume of which the LUN is A, is evicted one time from the first cache.

(One Example of an Access Control Table 501)

Figure 5:
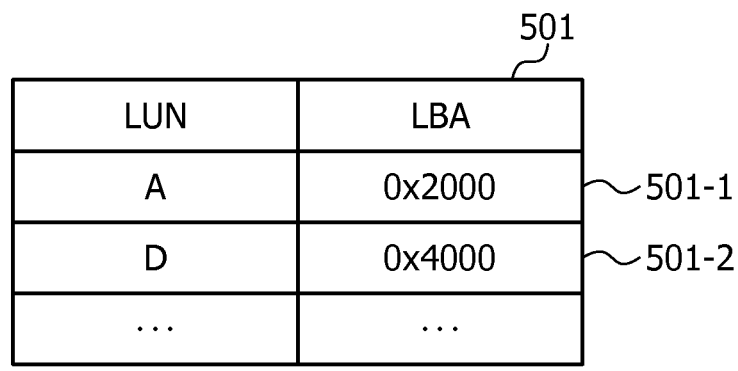
FIG. 5 is a diagram illustrating one example of contents that are stored in an access control table (SBE)

FIG. 5 is a diagram illustrating one example of contents that are stored in an access control table (SBE) 501. In FIG. 5, for example, the access address table 501 is created or updated by the storage control device 101, and is stored in the memory 302 of the storage control device 101.

The access control table 501 has such items as the LUN and the LBA. Access control information (for example, pieces of access control information 501-1 to 501-2) is stored as a record in the access control table 501 by setting information to be in each item.

At this point, the LUN is an identifier for identifying the logical volume of the storage device 103. The LBA is information by which an area within the logical volume, in which data that is retained in the second cache is to be stored, is specified.

A record of the access control table 501 can be associated with an area of the second cache. The data, which is stored in a predetermined range of distance from the storage area within the logical volume that is specified by the LBA in the access control table 501, is stored in the associated area of the second cache. The predetermined range is, for example, 0x200.

Any one of records of the access control table 501 is a least recently used (LRU) record. Furthermore, any one of the records of the access control table 501 is a most recently used (MRU) record. The LRU record is a record that has been least recently accessed. The MRU record is a record that has been most recently accessed.

The storage control device 101 can determine the LRU record or the MRU record using an attribute of each record of the access control table 501. For example, the attribute of the record can be set to be a turn at being registered or at being accessed. In this case, the storage control device 101 registers records sequentially in the access control table 501 from the top and moves the accessed record farthest down, and thus can determine that the LRU record is an uppermost record and the MRU record is a lowermost record.

In an example in FIG. 5, a record 501-1 indicates that the data, which is stored in a predetermined range of distance from LBA 0x2000 in the logical volume of which the LUN is A, is retained in the second cache. Furthermore, the record 501-1 is the LRU record, and a record 501-2 is the MRU record.

In the example in FIG. 5, the access control table 501 has a table structure, but can be set to have a list structure. The table structure is a structure that is configured to be in the form of rows that are arranged in order, and the list structure is a structure in which pieces of data are connected to one another using a pointer indicating a place where data is stored.

(One Example of a Bind Cache Table 601)

FIG. 6 is a diagram illustrating one example of contents that are stored in a bind cache table (BCT) 601. In FIG. 6, the bind cache table 601, for example, is created and updated by a user of the storage control device 101 before starting the storage control device 101, and is stored in the memory 302 of the storage control device 101. The bind cache table 601 corresponds to the first management information 111 in FIG. 1.

The bind cache table 601 has such items as the LUN, a starting LBA, and an ending LBA. Bind cache information (for example, pieces of bind cache information 601-1 to 601-3) is stored as a record in the bind cache table 601 by setting information to be in each item.

At this point, the LUN is an identifier for identifying the logical volume of the storage device 103. The starting LBA is information by which a starting storage area within the logical volume is specified, and the ending LBA is information by which an ending storage area is specified within the logical volume.

In a case where a request for access to a storage area from the starting LBA of the logical volume that is identified by the LUN to the ending LBA is present, the bind cache table 601 indicates that the storage area, which the request for access to which is present, is retained in the second cache.

In an example in FIG. 6, in a case where a request for access to a storage area from the starting LBA 0x3000 to the ending LBA 0x3600 in the logical volume of which the LUN is A is present, a record 601-1 indicates that the storage area, the request for access to which is present, is retained in the second cache.

(One Example of a Bind Cache Control Table 701)

FIG. 7 is a diagram illustrating one example of contents that are in a bind cache control table (BCE) 701. In FIG. 7, the bind cache control table 701, for example, is created and updated by the storage control device 101, and is stored in the memory 302 of the storage control device 101. The bind cache control table 701 corresponds to the second management information 112 in FIG. 1.

The bind cache control table 701 has such items as the LUN, the LBA, and the number of times of access. Bind cache control information (for example, pieces of bind cache control information 701-1 to 701-3) is stored as a record in the bind cache control table 701 by setting information to be in each item.

At this point, the LUN is an identifier for identifying the logical volume of the storage device 103. The LBA is information by which an area within the logical volume, in which the data that is retained in the second cache is to be stored is specified. The number of times of access indicates that the request from the host apparatus 102 for access to the data retained in the second cache is present.

A record of the bind cache control table 701 can be associated with an area of the second cache. The data that is stored in a predetermined range of distance from the storage area within the logical volume that is specified by the LBA of the bind cache control table 701 is stored in the area of the second cache that results from the association. The predetermined range is, for example, 0x200.

The record of the bind cache control table 701 can be associated with the region of the second cache as well. For this reason, for example, the area of the second cache is divided into two areas, and one area is allocated to a record of the bind cache control table 701 and the other area is allocated to a record of the access control table 501.

Any one of records of the bind cache control table 701 is the LRU record, and any one of records of the bind cache control table 701 is the MRU record.

The storage control device 101 can determine the LRU record or the MRU record using an attribute of each record of the bind cache control table 701. For example, the attribute of the record can be set to be a turn at being registered or at being accessed. In this case, the storage control device 101 registers records sequentially in the bind cache control table 701 from the top and moves the accessed record farthest down, and thus can determine that the LRU record is an uppermost record and the MRU record is a lowermost record.

In an example in FIG. 7, a record 701-1 indicates that the data, which is stored in a predetermined range of distance from LBA 0x3000 in the logical volume of which the LUN is A, is retained in the second cache and that the request from the host apparatus 102 for access occurs three times. Furthermore, the record 701-1 is the LRU record, and a record 701-3 is the MRU record.

In the example in FIG. 7, the bind cache control table 701 has the table structure, but can be set to have the list structure.

(Example of a Functional Configuration of the Storage Control Device 101)

Figure 8:
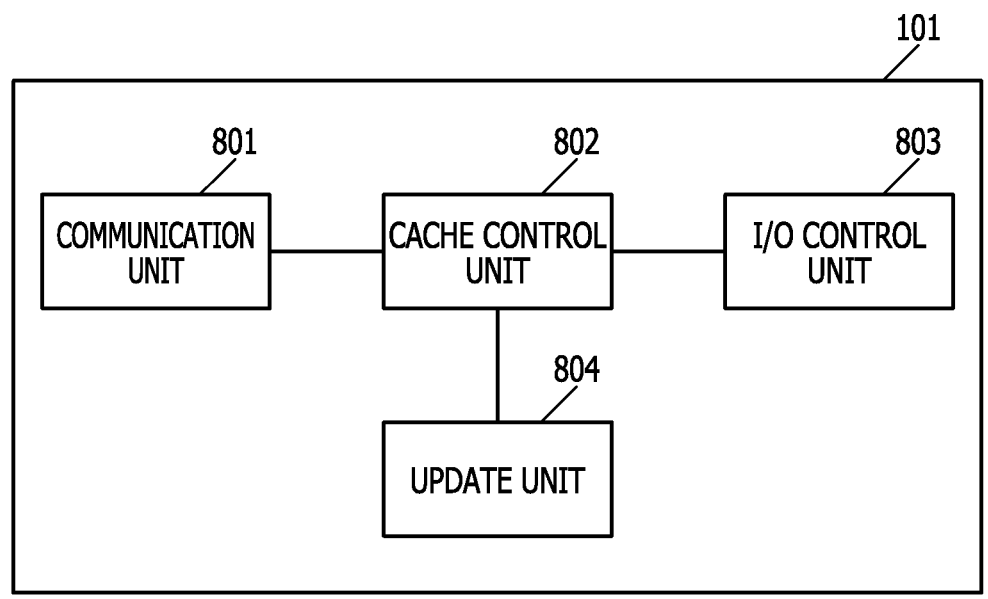
FIG. 8 is a block diagram illustrating an example of a functional configuration of a storage control device according to the embodiment.

Next, an example of a functional configuration of the storage control device 101 illustrated in FIG. 2 is described. FIG. 8 is a block diagram illustrating an example of a functional configuration of the storage control device 101 according to the embodiment. In FIG. 8 and later, the access address candidate list 401 is described as an SCT 401, the access control table 501 as an SBE 501, the bind cache table 601 as a BCT 601, and the bind cache control table 701 as a BCE 701. Furthermore, an address on the logical volume that includes the LUN and the LBA is simply referred to as an address.

In FIG. 8, the storage control device 101 is configured to include a communication unit 801, a cache control unit 802, an input/output (I/O) control unit 803, and an update unit 804. Specifically, for example, functional units that include the communication unit 801, the cache control unit 802, the I/O control unit 803, and the update unit 804 realize their functions by causing the CPU 301 to execute a program stored in a storage device such as the memory 302 illustrated in FIG. 3. A result of each functional unit, for example, is stored in the storage device such as the memory 302 illustrated in FIG. 3.

The communication unit 801 has a function of receiving the request for access to the data in the logical volume of the storage device 103 from the host apparatus 102 and of transmitting a response to the access request. For example, in a case where the access request is received, the communication unit 801 receives from the host apparatus 102 an access type, an identifier of the logical volume, and information by which a storage area within the logical volume is specified. The access type, for example, is a type of request for reading, writing, or the like. The identifier of the logical volume is the LUN. The information by which the storage area within the logical volume is specified is the LBN.

Furthermore, in a case of the request for writing, the communication unit 801 also receives data that is written to the logical volume. In a case of reading, when transmitting the response to the access request, the communication unit 801 transmits data that is read from the logical volume to the host apparatus 102.

The cache control unit 802 has a function of controlling data on the DRAM 201 and the PFM 202. In a case where the data (hereinafter referred to as requested data) in the logical volume, which is requested from the host apparatus 102, is retained on the DRAM 201, the cache control unit 802 responds to the access request from the host apparatus 102 with the data that is retained on the DRAM 201.

In a case where the requested data is not retained on the DRAM 201, the cache control unit 802 secures in the DRAM 201 an area for retaining the requested data. In a case where an unoccupied area is not present on the DRAM 201, the cache control unit 802 secures the unoccupied area by discarding a page on the DRAM 201. For example, the cache control unit 802 secures an unoccupied area by discarding a least recently used (LRU) page among pages on the DRAM 201. Processing after securing the unoccupied area will be described below.

At this point, in a case where an address of the requested data is included in an address registered in the BCE 701, the requested data is retained in the PFM 202. In this case, the cache control unit 802 transfers the requested data from the PFM 202 to the DRAM 201, and responds to the access request from the host apparatus 102 with the data that is retained on the DRAM 201. Included in the address of the requested data is an identifier of the logical volume (LUN) in which the requested data is present and the LBA by which the storage area in which the requested data is stored is specified on the logical volume.

Furthermore, the cache control unit 802 changes a record of the BCT 601, which includes the address of the requested data, to the most recently used record, and increases the number of times of access by one.

Furthermore, in a case where an address of the requested data is included in an address registered in the SBE 501, the requested data is retained in the PFM 202. In this case, the cache control unit 802 transfers the requested data from the PFM 202 to the DRAM 201, and responds to the access request from the host apparatus 102 with the data that is retained on the DRAM 201. Furthermore, the cache control unit 802 changes a record of the SBE 501, which includes the address of the requested data, to the most recently used record.

On the other hand, in a case where the address of the requested data is not registered in the BCE 701 and the SBE 501, the requested data is not retained in the PFM 202. In this case, the cache control unit 802 transfers the data from the storage area of the logical volume that is specified with the address of the requested data to the DRAM 201, and responds to the access request from the host apparatus 102 with the data that is retained on the DRAM 201.

In a case where the data is transferred from the storage area of the logical volume to the DRAM 201, the cache control unit 802 performs processing that deploys the transferred data to the PFM 202. The processing that deploys the transferred data to the PFM 202 will be described in detail below.

Here, processing after the cache control unit 802 secures an unoccupied area on the DRAM 201 is described. In a case where an address of the discarded page is included in an address registered in the SCT 401, the cache control unit 802 increases the number of times that a record including the address of the discarded data has been evicted, by one, and performs the processing that deploys the discarded data to the PFM 202.

In a case where an address of the discarded page is not included in an address registered in the SCT 401, the cache control unit 802 registers the address of the discarded page in the SCT 401. Furthermore, in a case where an area for registration is not available in the SCT 401, for example, the cache control unit 802 creates an area for registration by discarding the least recently used record. Thereafter, the cache control unit 802 sets the number of times that the record including the address of the discarded data has been evicted to 1, and performs the processing that deploys the discarded data to the PFM 202.

Here, processing in which the cache control unit 802 deploys data to the PFM 202 is described. The data here is data of which processing is requested from the host apparatus 102 or data that is discarded from the DRAM 201.

In a case where an address of data is registered in the BCT 601, the cache control unit 802 registers the address of the data in the BCE 701. Thereafter, the cache control unit 802 accesses the storage device 103, and transfers data from the storage device 103 to the PFM 202. Because the record registered in the BCE 701 is the most recently accessed record, the cache control unit 802 changes the record registered in the BCE 701 to the MRU record. Furthermore, because the record registered in the BCE 701 is the first access, the cache control unit 802 sets the number of times of access to 1.

In a case where an unoccupied area is not available in the BCE 701 and an unoccupied area is available in the SBE 501, the cache control unit 802 may register an address of data in the SBE 501. In a case where an unoccupied area is not available in the BCE 701, the cache control unit 802 may create an unoccupied area by deleting the least recently used record among records of the BCE 701. Furthermore, in a case where the number of times that the least recently used record has been accessed is at or above a predetermined value, the cache control unit 802 may not delete the least recently used record.

In this case, the cache control unit 802 changes the least recently used record to the most recently used record, and initializes the number of times of access. As the initialization of the number of times of access, for example, the number of times of access is set to 1. Thereafter, in a case where the cache control unit 802 determines whether or not the number of times that the least recently used record is accessed is less than a predetermined value, and determines that the number of times that the least recently used record is accessed is less than the predetermined value, the cache control unit 802 deletes such a record. In a case where the number of times that the least recently used record is accessed is not less than the predetermined value, the cache control unit 802 changes such a record to the most recently used record and initializes the number of times of access.

In a case where an unoccupied area is difficult to create in the BCE 701, the cache control unit 802 repeats the operation described above a predetermined number of times and deletes the least recently used record that has been accessed a number of times less than the predetermined value, and thus registers an address of data in the SBE 501.

In a case where an unoccupied area is not present in the SBE 501 either, the cache control unit 802 can create an unoccupied area in the SBE 501 by discarding the least recently used record among the records of the SBE 501.

Thereafter, the cache control unit 802 accesses the storage device 103, and transfers data from the storage device 103 to the PFM 202. Because the record registered in the SBE 501 is the most recently accessed record, the cache control unit 802 changes the record registered in the SBE 501 to the MRU record.

In a case where the an address of data is registered in the SCT 401 and the number of times that a record of the address of the data is evicted is at or above a threshold X, the cache control unit 802 registers the address of the data in the SBE 501. Thereafter, the cache control unit 802 accesses the storage device 103, and transfers data from the storage device 103 to the PFM 202.

Because the record registered in the SBE 501 is the most recently accessed record, the cache control unit 802 changes the record registered in the SBE 501 to the MRU record. Thereafter, because the address of the data is registered in the SBE 501, the cache control unit 802 deletes the address of the data from the SCT 401.

Furthermore, the cache control unit 802 may respond to the access request from the host apparatus 102 with the data that is retained in the PFM 202, without transferring the data on the PFM 202 to the DRAM 201. Furthermore, the cache control unit 802 may transfer the data on the storage device 103 to the PFM 202 without transferring the data on the storage device 103 onto the DRAM 201, and may respond to the access request from the host apparatus 102 with the data on the PFM 202.

Furthermore, when the data discarded from the DRAM 201 is transferred, the cache control unit 802 may preserve the discarded data in a buffer and may transfer the data from the buffer onto the PFM 202.

The I/O control unit 803 has a function of performing I/O processing on the storage device 103. For example, in a case where the request from the host apparatus 102 is a request for data reading, and the request data is not retained in the DRAM 201 and the PFM 202, the I/O control unit 803 reads the requested data from the storage device 103. Furthermore, in a case where the request from the host apparatus 102 is a request for data writing, the I/O control unit 803 writes the requested data to the DRAM 201 and the PFM 202 and then writes the requested data to the storage device 103.

The update unit 804 has a function of updating a threshold X. The update unit 804 calculates a usage ratio of the BCE 701. At this point, the usage ratio of the BCE 701 is a ratio of the number of records for which the LUN, the LBA, and the number of times of access are registered to the upper-limit number of registered records of the BCE 701. The high usage ratio of the BCE 701 means that because the record of the BCE 701 corresponds to the second cache, the number of unoccupied areas of the second cache is small.

In a case where the usage ratio of the BCE 701 is at or above a first predetermined value, the update unit 804 increases the threshold X. The first predetermined value can be set to be a value of 71% to 100% values. Because an increase in the threshold X decreases the number of addresses not to be registered in the SCT 401 that are to be registered in the SBE 501, the number of unoccupied areas of the SBE 501 increases. Accordingly, the address that is difficult to register in the BCE 701 can be registered in the SBE 501, and the data at the address that is registered in the BCT 601 can be retained in the PFM 202.

In a case where the usage ratio of the BCE 701 is a second predetermined value or below, the update unit 804 decreases the threshold X. The second predetermined value can be set to be a value of 0% to 70% values. Because a decrease in threshold X increases the number of addresses registered in the SCT 401 that are to be registered in the SBE 501, the number of unoccupied areas of the SBE 501 decreases. Accordingly, the data at the address registered in the SCT 401 can be retained in the PFM 202.

(One Example of a Procedure for I/O Processing)

Figure 9:
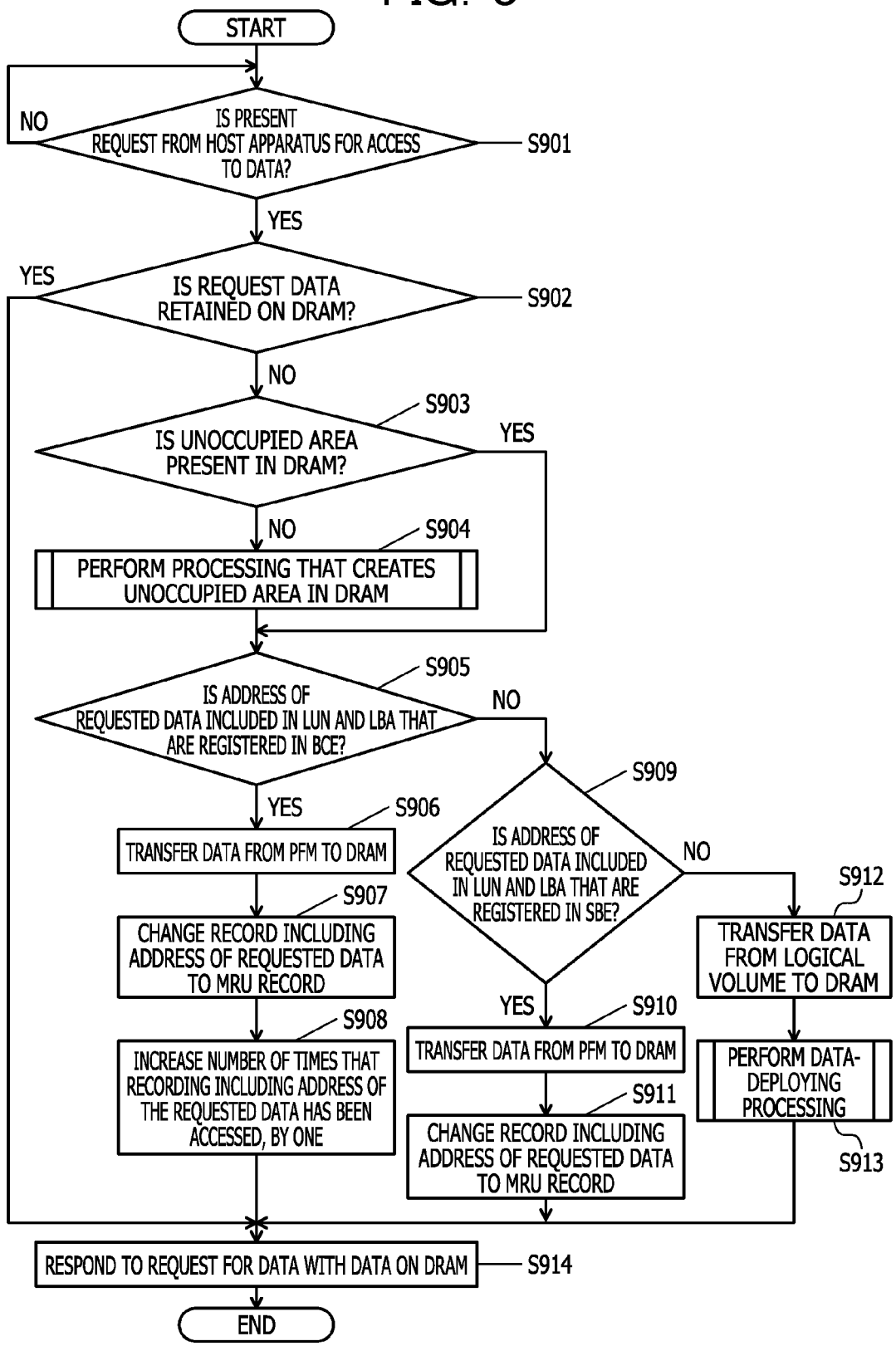
FIG. 9 is a flowchart illustrating one example of a procedure for I/O processing by the storage control device according to the embodiment.

FIG. 9 is a flowchart illustrating one example of a procedure for I/O processing by the storage control device 101 according to the embodiment. In FIG. 9, first, the storage control device 101 determines whether or not a request from the host apparatus 102 for access to data is present (Step S901).

In a case where the request from the host apparatus 102 for access to data is not present (No in Step S901), processing by the storage control device 101 returns to Step S901. In a case where the request from the host apparatus 102 for access to data is present (Yes in Step S901), the storage control device 101 determines whether or not the requested data is retained in the DRAM 201 (Step S902).

In a case where the requested data is retained in the DRAM 201 (Yes in Step S902), the processing by the storage control device 101 proceeds to Step S914. In a case where the requested data is not retained in the DRAM 201 (No in Step S902), the storage control device 101 determines whether or not an unoccupied area for retaining the data requested from the host apparatus 102 is present in the DRAM 201 (Step S903).

In a case where an unoccupied area is not present in the DRAM 201 (No in Step S903), the storage control device 101 performs processing that creates an unoccupied area in the DRAM 201 (Step S904). The processing by the storage control device 101, which creates an unoccupied area in the DRAM, will be described in detail below referring to FIG. 10.

In a case where an unoccupied area is present in the DRAM 201 (Yes in Step S903) and an unoccupied area is created in the DRAM 201, the storage control device 101 determines whether or not an address of the requested data is included in the LUN and the LBA that are registered in the BCE 701 (Step S905).

In a case where the address of the requested data is included in the LUN and the LBA that are registered in the BCE 701 (Yes in Step S905), because the requested data is retained in the PFM 202, the storage control device 101 transfers the requested data from the PFM 202 to the DRAM 201 (Step S906). The storage control device 101 changes a record including the address of the requested data to the most recently used (MRU) record (Step S907). The storage control device 101 increases the number of times that the record including the requested data has been accessed, by one (Step S908). Thereafter, the processing by the storage control device 101 proceeds to Step S914.

In a case where the address of the requested data is not included in the LUN and the LBA that are registered in the BCE 701 (No in Step S905), the storage control device 101 determines whether or not the address of the requested data is included in the LUN and the LBA that are registered in the SBE 501 (Step S909).

In a case where the address of the requested data is included in the LUN and the LBA that are registered in the SBE 501 (Yes in Step S909), because the requested data is retained in the PFM 202, the storage control device 101 transfers the requested data from the PFM 202 to the DRAM 201 (Step S910). The storage control device 101 changes a record including the address of the requested data to the most recently used (MRU) record (Step S911). Thereafter, the processing by the storage control device 101 proceeds to Step S914.

In a case where the address of the requested data is not included in the LUN and the LBA that are registered in the SBE 501 (No in Step S909), the requested data is not retained in the PFM 202. For this reason, in a case where the request from the host apparatus 102 for data is a request for data reading, the storage control device 101 transfers data from a storage area of the logical volume of the storage device 103, which is included in the address of the requested data, to the DRAM 201 (Step S912). Thereafter, the storage control device 101 performs data-deploying processing on the data in the storage area of the logical volume, which is included in the address of the requested data (Step S913). The data-deploying processing by the storage control device 101 will be described in detail below referring to FIGS. 11 and 12.

Because the requested data is retained on the DRAM 201, the storage control device 101 responds to the request for data with the data on the DRAM 201 (Step S914). In a case where the request from the host apparatus 102 for data is the request for data reading, the data on the DRAM 201 is transferred to the host apparatus 102. In a case where the request from the host apparatus 102 for data is the request for data writing, the data transferred from the host apparatus 102 is written to the data on the DRAM 201.

Accordingly, a sequence of processing operations in the present flowchart ends. By performing processing operations in the present flowchart, the request from the host apparatus 102 for data is performed.

(One Example of a Procedure for Processing that Creates an Unoccupied Area in the DRAM)

Figure 10:
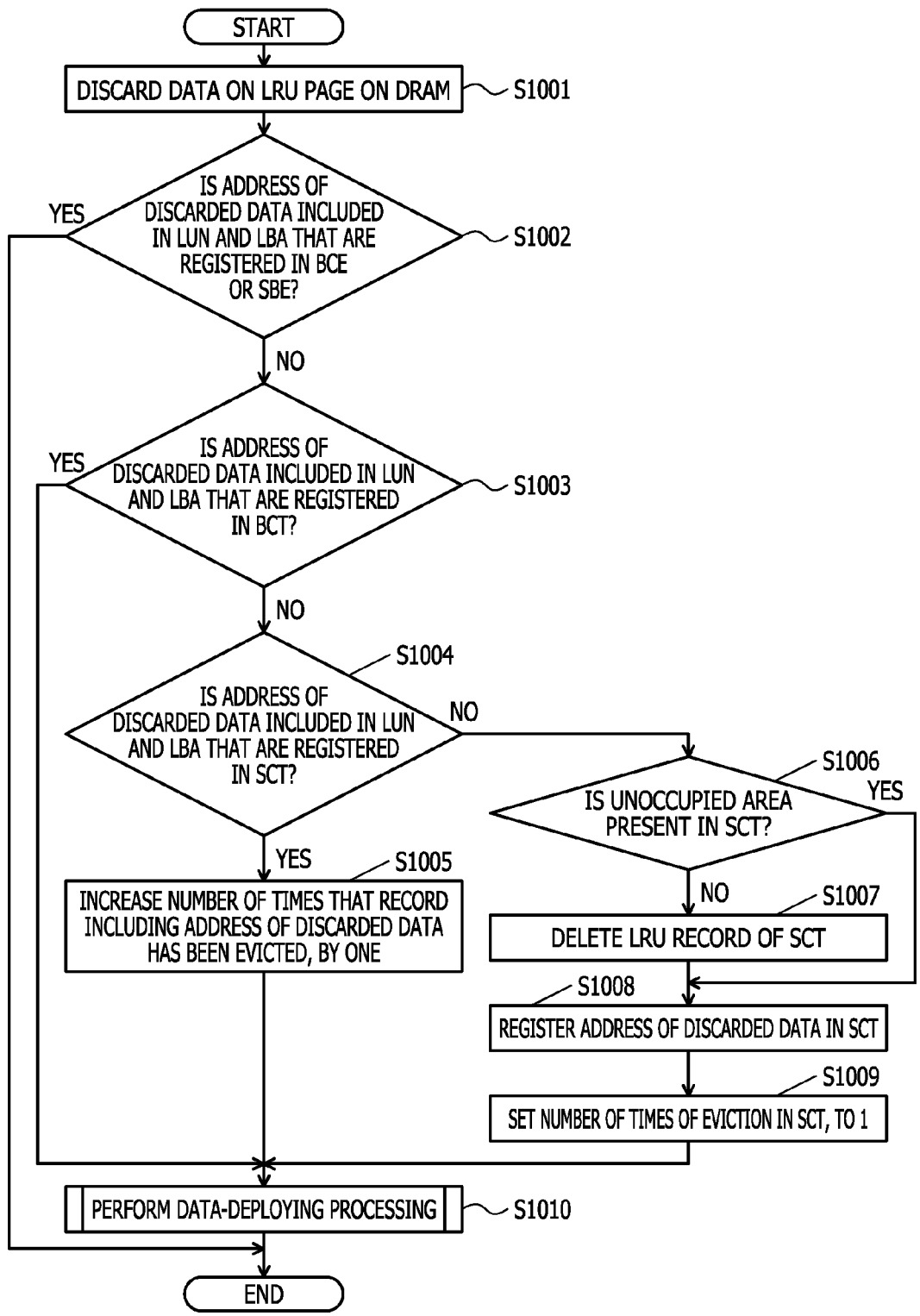
FIG. 10 is a flowchart illustrating one example of a procedure for processing that creates an unoccupied area in a DRAM of the storage control device according to the embodiment.

FIG. 10 is a flowchart illustrating one example of a procedure for processing that creates an unoccupied area in the DRAM of the storage control device 101 according to the embodiment. First, the storage control device 101 discards data on the least recently used (LRU) page among the pages on the DRAM 201 (Step S1001).

The storage control device 101 determines whether or not an address of the discarded data is included in the LUN and the LBA that are registered in the BCE 701 or the SBE 501 (Step S1002). In a case where the address of the discarded data is included in the LUN and the LBA that are registered in the BCE 701 or the SBE 501 (Yes in Step S1002), because the discarded data is retained in the PFM 202, the storage control device 101 ends the processing.

In a case where the address of the discarded data is not included in the LUN and the LBA that are registered in the BCE 701 and the SBE 501 (No in Step S1002), the storage control device 101 determines whether or not the address of the discarded data is included in the LUN and the LBA that are registered in the BCT 601 (Step S1003). In a case where the address of the discarded data is included in the LUN and the LBA that are registered in the BCT 601 (Yes in Step S1003), the storage control device 101 may not register the address of the discarded data in the SCT 401. For this reason, the processing by the storage control device 101 proceeds to Step S1010.

In a case where the address of the discarded data is not included in the LUN and the LBA that are registered in the BCT 601 (No in Step S1003), the storage control device 101 determines whether or not the address of the discarded data is included in the LUN and the LBA that are registered in the SCT 401 (Step S1004).

In a case where the address of the discarded data is included in the LUN and the LBA that are registered in the SCT 401 (Yes in Step S1004), the storage control device 101 increases the number of times that the record including the address of the discarded data has been evicted, by one (Step S1005). Thereafter, the processing by the storage control device 101 proceeds to Step S1010.

In a case where the address of the discarded data is not included in the LUN and the LBA that are registered in the SCT 401 (No in Step S1004), the storage control device 101 determines whether or not an unoccupied area is present in the SCT 401 (Step S1006). In a case where an unoccupied area is not present in the SCT 401 (No in Step S1006), the storage control device 101 deletes the least recently used (LRU) record among records of the SCT 401 (Step S1007). Thereafter, the processing by the storage control device 101 proceeds to Step S1008.

In a case where an unoccupied area is present in the SCT 401 (Yes in Step S1006), the storage control device 101 registers the address of the discarded data in the SCT 401 (Step S1008). The storage control device 101 sets the number of times that the registered record has been evicted, to 1 (Step S1009).

Thereafter, the storage control device 101 performs the data-deploying processing on the discarded data (Step S1010). The data-deploying processing by the storage control device 101 will be described in detail below referring to FIGS. 11 and 12.

Accordingly, a sequence of processing operations in the present flowchart ends. By the processing operations in the present flowchart, an unoccupied area is created on the DRAM 201, and the processing is performed on the address of the data discarded from the DRAM 201.

(One Example of a Procedure for the Data-Deploying Processing)

Figure 11:
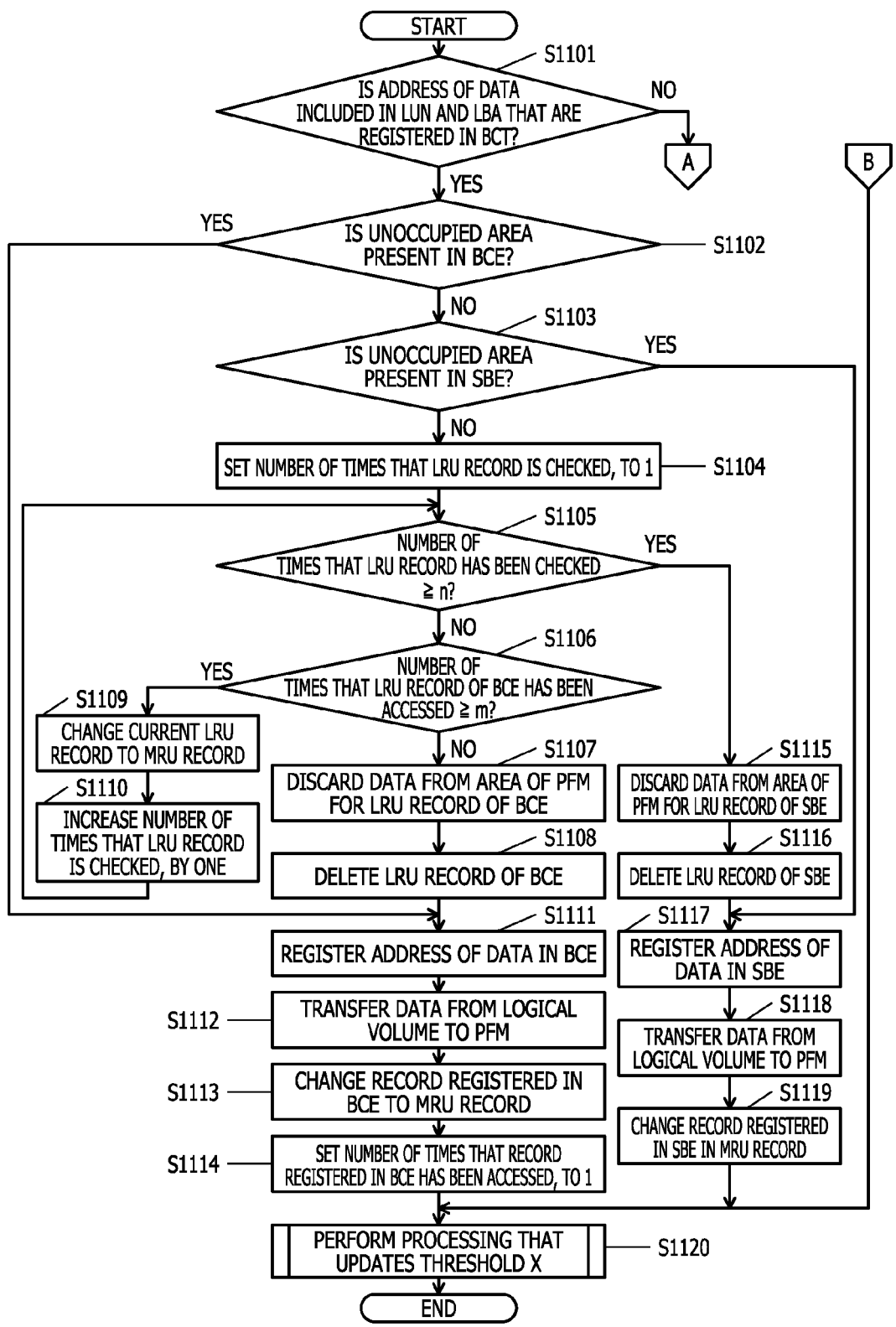
FIG. 11 is a flowchart (which corresponds to the first portion) illustrating one example of a procedure for data-deploying processing by the storage control device according to the embodiment.
Figure 12:
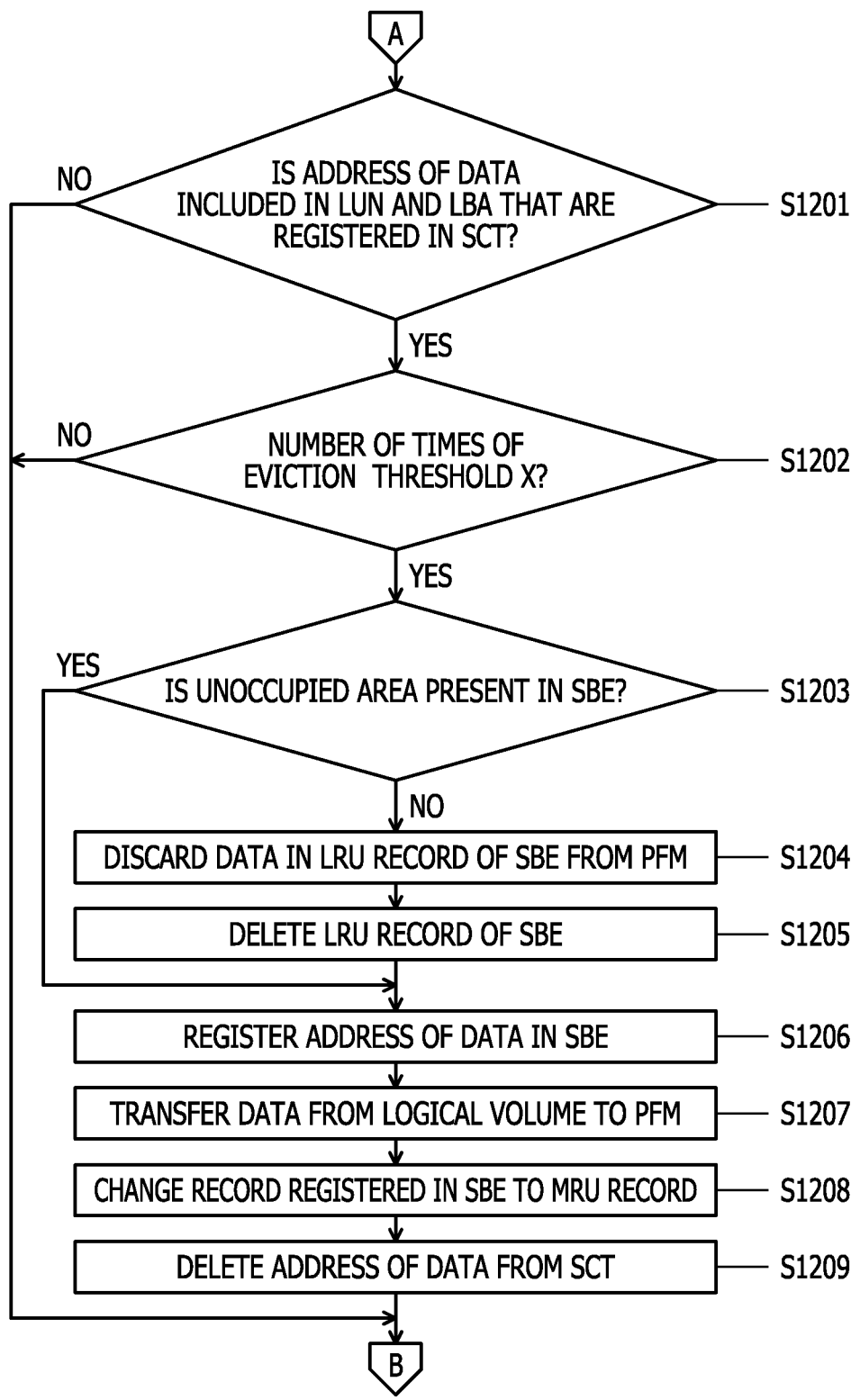
FIG. 12 is a flowchart (which corresponds to the second portion) illustrating one example of the procedure for the data-deploying processing by the storage control device according to the embodiment.

FIGS. 11 and 12 are flowcharts each of which illustrates one example of a procedure for the data-deploying processing by the storage control device 101 according to the embodiment. First, the storage control device 101 determines whether or not the address of the data on which the data-deploying is performed is included in the LUN and the LBA that are registered in the BCT 601 (Step S1101). At this point, when called from the procedure for the data-deploying in S913 in FIG. 9, the data on which the data-deploying is performed is data that is requested from the host apparatus 102, and when called from the procedure for the data-deploying in S1010 in FIG. 10, the data on which the data-deploying is performed is data that is discarded from the DRAM 201.

In a case where the address of the data on which the data-deploying is performed is included in the LUN and the LBA that are registered in the BCT 601 (Yes in Step S1101), the storage control device 101 determines whether or not an unoccupied area is present in the BCE 701 (Step S1102).

In a case where an unoccupied area is present in the BCE 701 (Yes in Step S1102), the processing by the storage control device 101 proceeds to Step S1111. In a case where an unoccupied area is not present in the BCE 701 (No in Step S1102), the storage control device 101 determines whether or not an unoccupied area is present in the SBE 501 (Step S1103). In a case where an unoccupied area is present in the SBE 501 (Yes in Step S1103), the processing by the storage control device 101 proceeds to Step S1117.

In a case where an unoccupied area is not present in the SBE 501 (No in Step S1103), because an unoccupied area is not present in any one of the BCE 701 and the SBE 501, the storage control device 101 attempts to secure an unoccupied area from the BCE 701. For this reason, first, the storage control device 101 sets the number of times that the LRU record has been checked, to 1 (Step S1104). Next, the storage control device 101 determines whether or not the number of times of that the LRU record has been checked is equal to or greater than a predetermined number of times n (Step S1105).

In a case where the number of times that the LRU record is checked is neither equal to nor greater than a predetermined number of times n (No in Step S1105), the storage control device 101 determines whether or not the number of times that the least recently used (LRU) record among the records of the BCE 701 has been accessed is equal to or greater than a predetermined value m (Step S1106). In a case where the number of times that the least recently used (LRU) record among the records of the BCE 701 has been accessed is equal to or greater than the predetermined value m (Yes in Step S1106), because such a record is the LRU record, but has been accessed greater than a predetermined number of times, the storage control device 101 sets the record not to be eligible for deletion.

For this reason, the storage control device 101 changes a current LRU record to the most recently used (MRU) record (Step S1109). The storage control device 101 may initialize the number of times that the record that is changed to the MRU record is accessed. For example, the storage control device 101 sets the number of times of access to 1. Thereafter, the storage control device 101 increases the number of times that the LRU record is checked, by one (Step S1110), and the processing by the storage control device 101 proceeds to Step S1105.

In a case where the number of times that the least recently used (LRU) record among the records of the BCE 701 has been accessed is not equal to or greater than the predetermined value m (No in Step S1106), the storage control device 101 discards data from an area of the PFM 202, which is associated with the LRU record of the BCE 701 (Step S1107). Next, the storage control device 101 deletes the LRU record of the BCE 701 (Step S1108).

In a case where an unoccupied area is present in the BCE 701, or in a case where an unoccupied area is secured in the BCE 701, the storage control device 101 registers the address of the data in the BCE 701 (Step S1111). Next, the storage control device 101 transfers the data from the storage area of the logical volume, which is included in the address of the data, to the PFM 202 (Step S1112).

Because the record registered in the BCE 701 is the most recently accessed (MRU) record, the storage control device 101 changes the record registered in the BCE 701 to the MRU record (Step S1113). Furthermore, because the record registered in the BCE 701 is the first access, the storage control device 101 sets the number of times of access to 1 (Step S1114). Next, the processing by the storage control device 101 proceeds to Step S1120.

In a case where the number of times that the LRU record is checked is equal to or greater than a predetermined number of times n (Yes in Step S1105), because an unoccupied area is difficult to secure in the BCE 701, the storage control device 101 secures an unoccupied area from the SBE 501. For this reason, the storage control device 101 discards the data from an area of the PFM 202, which is associated with the least recently used (LRU) record among the records of the SBE 501 (Step S1115). Next, the storage control device 101 deletes the LRU record of the SBE 501 (Step S1116).

In a case where an unoccupied area is present in the SBE 501, or in a case where an unoccupied area is secured in the SBE 501, the storage control device 101 registers the address of the data in the SBE 501 (Step S1117). Next, the storage control device 101 transfers the data from the storage area of the logical volume, which is included in the address of the data, to the PFM 202 (Step S1118).

Because the record registered in the SBE 501 is the most recently accessed (MRU) record, the storage control device 101 changes the record registered in the SBE 501 to the MRU record (Step S1119). Next, the processing by the storage control device 101 proceeds to Step S1120.

At this point, in a case where the address of the data on which the data-deploying is performed is not registered in the BCT 601 (No in Step S1101), the storage control device 101 determines whether or not the address of the data is included in the LUN and the LBA that are registered in the SCT 401 (Step S1201). In a case where the address of the data is not included in the LUN and the LBA that are registered in the SCT 401 (No in Step S1201), because the address of the data may not be registered in the BCE 701 and the SBE 501, the processing by the storage control device 101 proceeds to Step S1120.

In a case where the address of the data is included in the LUN and the LBA that are registered in the SCT 401 (Yes in Step S1201), the storage control device 101 checks whether or not the number of times that the record at the address of the registered data has been evicted is at or above the threshold X (Step S1202). In a case where the number of times that the record at the address of the registered data has been evicted is not at or above the threshold X (No in Step S1202), because the address of the data may not be registered in the SBE 501, the processing by the storage control device 101 proceeds to Step S1120.

In a case where the number of times that the record at the address of the registered data has been evicted is at or above the threshold X (Yes in Step S1202), because the address of the data is registered in the SBE 501, the storage control device 101 determines whether or not an unoccupied area is present in the SBE 501 (Step S1203). In a case where an unoccupied area is present in the SBE 501 (Yes in Step S1203), the processing by the storage control device 101 proceeds to Step S1206.

In a case where an unoccupied area is not present in the SBE 501 (No in Step S1203), the storage control device 101 discards the data from the area of the PFM 202, which is associated with the least recently used (LRU) record among the records of the SBE 501 (Step S1204). Next, the storage control device 101 deletes the LRU record of the SBE 501 (Step S1205).

In the case where an unoccupied area is present in the SBE 501, or in the case where an unoccupied area is secured in the SBE 501, the storage control device 101 registers the address of the data in the SBE 501 (Step S1206). Next, the storage control device 101 transfers the data from the storage area of the logical volume, which is included in the address of the data, to the PFM 202 (Step S1207).

Next, because the record registered in the SBE 501 is the most recently accessed (MRU) record, the storage control device 101 changes the record registered in the SBE 501 to the MRU record (Step S1208). Next, because the address of the data is registered in the SBE 501, the storage control device 101 deletes the address of the data from the SCT 401 (Step S1209). Next, processing that updates the threshold X is performed (Step S1120). The processing by the storage control device 101, which updates the threshold X, will be described in detail below referring to FIG. 13.

Accordingly, a sequence of processing operations in the present flowchart ends. By performing the processing operations in the present flowchart, the address of the data is registered in the BCE 701 or the SBE 501, and the data is transferred from the storage area of the logical volume to the PFM 202.

(One Example of a Procedure for the Processing that Updates the Threshold X)

Figure 13:
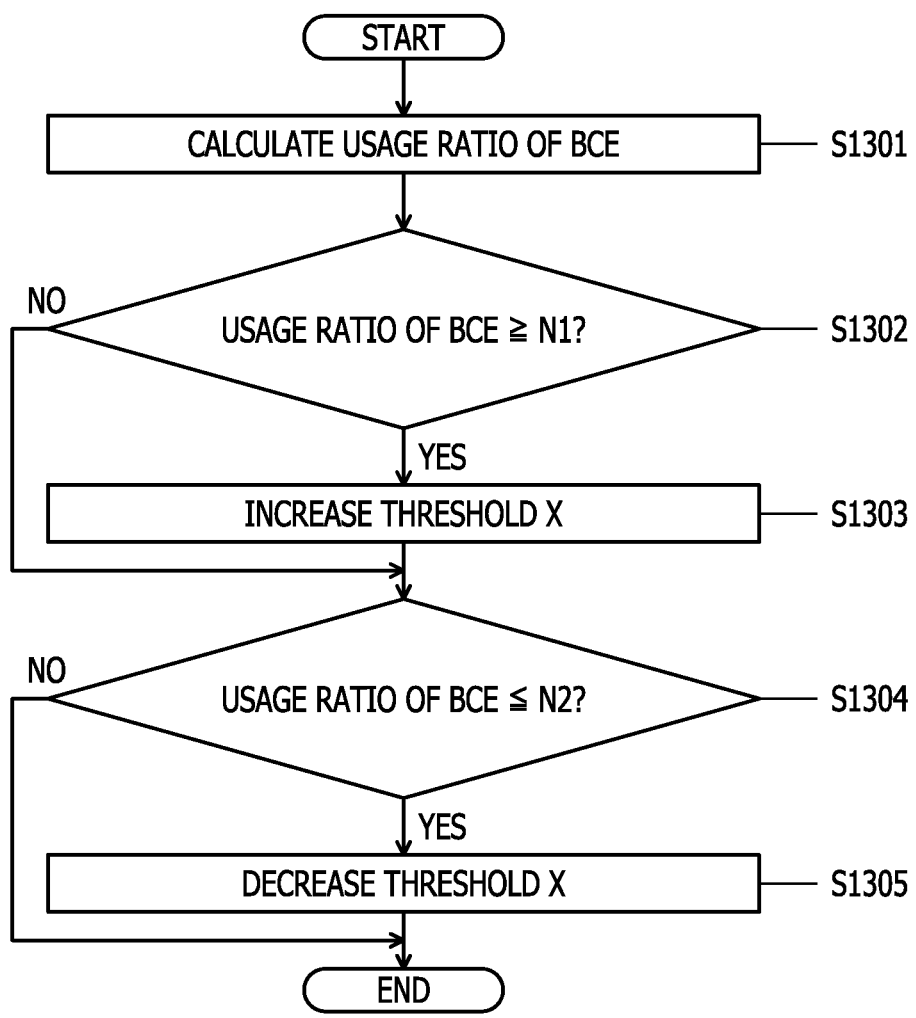
FIG. 13 is a flowchart illustrating one example of a procedure for processing by the storage control device according to the embodiment, which updates a threshold X.

FIG. 13 is a flowchart illustrating one example of the procedure for the processing by the storage control device 101 according to the embodiment, which updates the threshold X. First, the storage control device 101 calculates the usage ratio of the BCE 701 (Step S1301). The storage control device 101 determines whether or not the calculated usage ratio of the BCE 701 is at or above a first predetermined value N1 (Step S1302).

In a case where the calculated usage ratio of the BCE 701 is not at or above the first predetermined value N1 (No in Step S1302), the processing by the storage control device 101 proceeds to Step S1304. In a case where the calculated usage ratio of the BCE 701 is above the first predetermined value N1 (Yes in Step S1302), the storage control device 101 increases the threshold X (Step S1303).

Next, the storage control device 101 determines whether or not the calculated usage ratio of the BCE 701 is at or below a second predetermined value N2 (Step S1304). In a case where the calculated usage ratio of the BCE 701 is not at or below the second predetermined value N2 (No in Step S1304), the processing by the storage control device 101 ends. In a case where the calculated usage ratio of the BCE 701 is below the second predetermined value N2 (Yes in Step S1304), the storage control device 101 decreases the threshold X (Step S1305).

Accordingly, a sequence of processing operations in the present flowchart ends. By performing the processing operations in the present flowchart, the threshold X is increased or decreased according to the usage ratio of the BCE 701.

(One Example of I/O Processing)

FIGS. 14A to 14E, 15A to 15D, and 16A to 16D are diagrams illustrating one example of I/O processing by the storage control device 101 according to the present embodiment. In FIGS. 14A to 14E, 15A to 15D, and 16A to 16D, a modification example of contents that are stored in the SCT 401, the SBE 501, the BCT 601, and the BCE 701 of the storage control device 101, which result from the I/O processing by the storage control device 101, is illustrated. According to the present embodiment, an area 0x200 of the PFM 202 is associated with a record of each of the SBE 501 and the BCE 701.

FIG. 14A illustrates an initial state, that is, a state that results when the storage control device 101 has never performed the I/O processing. In this state, nothing is registered in the SCT 401, the SBE 501, and the BCE 701 of the storage control device 101. On the other hand, starting LBA 0x6000, ending LBA 0x7000 of LUN #D, and starting LBA 0x3000 and ending LBA 0x3800 of LUN #A are registered, as pieces of information that are retained in the PFM 202, in advance in the BCT 601.

In a state in FIG. 14A, the host apparatus 102 makes a request for access to data that is stored in LBA 0x3000 to 0x3200 of LUN #A.

In this case, a request from the host apparatus 102 for access to data is present (Yes in Step S901), and this is a first I/O. For this reason, the requested data is not retained on the DRAM 201 (No in Step S902), and an unoccupied area is present in the DRAM 201 (Yes in Step S903).

Furthermore, nothing is registered in the BCE 701 (No in Step S905), and nothing is registered in the SBE 501 (No in Step S909). For this reason, the storage control device 101 transfers data from LBA 0x3000 to 0x3200 of LUN #A to the DRAM 201 (Step S912). Thereafter, the storage control device 101 performs the data-deploying processing (Step S913).

In the data-deploying processing, LBA 0x3000 to 0x3200 of LUN #A is registered in the BCT 601 (Yes in Step S1101), and an unoccupied area is present in the BCE 701 (Yes in Step S1102). For this reason, the storage control device 101 registers an address of data in the BCE 701 (Step S1111). Thereafter, the storage control device 101 performs processing operations in Steps S1112 to S1114, and registers LBA 0x3000 of LUN #A in the BCE 701. Thereafter, the storage control device 101 updates the threshold X (Step S1120). Because the processing that updates the threshold X has no relationship with transition of contents that are stored in the SCT 401, the SBE 501, the BCT 601, and the BCE 701, a description of the processing is omitted.

With the processing described above, the contents that are stored in the SCT 401, the SBE 501, the BCT 601, and the BCE 701 in FIG. 14B undergo transition. Specifically, the record at LBA 0x3000 of LUN #A is registered in the BCE 701, and the number of times of access is set to 1.

In a state in FIG. 14B, the I/O processing of anything other than the LUN and the LBA that are registered in the BCT 601 is performed from the host apparatus 102, and an unoccupied area is not present in the DRAM 201. In this state, the I/O processing of anything other than the LUN and the LBA that are registered in the BCT 601 is performed from the host apparatus 102.

In this case, because an unoccupied area is not present in the DRAM 201, the storage control device 101 performs processing that creates an unoccupied area in the DRAM 201 (Step S904). With the processing that creates an unoccupied area in the DRAM, the storage control device 101 discards a page at LBA 0x1800 of LUN #B (Step S1001) as the least recently used (LRU) page, among the pages on the DRAM 201.

LBA 0x1800 of LUN #B, which is discarded is not included in the LUN and the LBA that are registered in the BCE 701 and the SBE 501 (No in Step S1002). Furthermore, LBA 0x1800 of LUN #B, which is discarded, is not included in the LUN and the LBA that are registered in the BCT 601 (No in Step S1003), nor is it included in the LUN and the LBA that are registered in the SCT 401 (No in Step S1004). Furthermore, an unoccupied area is present in the SCT 401 (Yes in Step S1006).

For this reason, the storage control device 101 registers an address of the data that is discarded from the DRAM 201, in SCT 401 (Step S1008). The storage control device 101 sets the number of times that the registered record is evicted, to 1 (Step S1009).

With the processing described above, the contents that are stored in the SCT 401, SBE 501, BCT 601 and the BCE 701 in FIG. 14C undergo transition. Specifically, a record at LBA 0x1800 of LUN #B is registered in SCT 401 and the number of times of eviction is set to 1.

In a state in FIG. 14C, the further I/O processing of anything other than the LUN and the LBA that are registered in the BCT 601 is performed from the host apparatus 102. With the I/O processing of these, data at LBA 0x1800 of LUN #B is evicted from the DRAM 201.

In this case, LBA 0x1800 of LUN #B, which is discarded, is included in the LUN and the LBA that are registered in the SCT 401 (Yes in Step S1004). For this reason, the storage control device 101 increases the number of times that the record at LBA 0x1800 of LUN #B, which is discarded, has been evicted, by one (Step S1005).

With the processing described above, the contents that are stored in the SCT 401, the SBE 501, the BCT 601, and the BCE 701 in FIG. 14D undergo transition. Specifically, the number of times that the record at LBA 0x1800 of LUN #B has been evicted is 2.

In a state in FIG. 14D, the further I/O processing of anything other than the LUN and LBA that are registered in the BCT 601 is performed from the host apparatus 102. With the I/O processing of these, data at LBA 0x3000 of LUN #C is evicted three times from DRAM 201, data at LBA 0x2800 of LUN #A is evicted four times from DRAM 201, and data at LBA 0x8000 of LUN #D is evicted two times from DRAM 201.

In this case, with the processing that is the same as the processing that is performed in FIGS. 14C and 14D, the storage control device 101 updates the SCT 601.

With the processing described above, the contents that are stored in the SCT 401, the SBE 501, the BCT 601, and the BCE 701 in FIG. 14E undergo transition. Specifically, the number of times that a record at LBA 0x3000 of LUN #C is evicted is 3, the number of times that a record at LBA 0x2800 of LUN #A is evicted is 4, and the number of times that a record at LBA 0x8000 of LUN #D is 2.

In a state in FIG. 14E, the I/O processing of anything other than the LUN and the LBA that are registered in BCT 601 is further performed from the host apparatus 102, and data at LBA 0x8800 of LUN #D is evicted from the DRAM 201.

In this case, LBA 0x8800 of LUN #D, which is discarded, is not included in the LUN and the LBA that are registered in the SCT 401 (No in Step S1004). Because an unoccupied area is not present in the SCT 401, the storage control device 101 deletes the record at LBA 0x1800 of the LUN #B as the least recently used (LRU) record among the records of the SCT 401 (Step S1007). The storage control device 101 registers LBA 0x8800 of LUN #D in the SCT 401 (Step S1008). The storage control device 101 sets the number of times that the registered record has been evicted, to 1 (Step S1009).

With the processing described above, the contents that are stored in the SCT 401, the SBE 501, the BCT 601, and the BCE 701 in FIG. 15A undergo transition. Specifically, the record at LBA 0x1800 of the LUN #B is deleted from the SCT 401, and LBA 0x8800 of LUN #D is registered in the SCT 401.

In a state in FIG. 15A, the I/O processing of anything other than the LUN and the LBA that are registered in the BCT 601 is further performed, and the data at LBA 0x2800 of LUN #A is evicted from the DRAM 201. According to the present embodiment, the threshold X is 5.

In this case, the number of times that the record at LBA 0x2800 of LUN #A has been evicted is at or above the threshold X, and an unoccupied area is present in the SBE 501. For this reason, the storage control device 101 registers LBA 0x2800 of LUN #A in the SBE 501 (Step S1206). Next, the storage control device 101 transfers the data from the storage area of the logical volume, which is included in the address of the data, to the PFM 202 (Step S1207).

Next, the storage control device 101 changes the record at LBA 0x2800 of LUN #A to the MRU record (Step S1208). Next, because LBA 0x2800 of LUN #A is registered in the SBE 501, the storage control device 101 deletes the record at LBA 0x2800 of LUN #A from the SCT 401 (Step S1209).

With the processing described above, the contents that are stored in the SCT 401, the SBE 501, the BCT 601, and the BCE 701 in FIG. 15B undergo transition. Specifically, the record at LBA 0x2800 of LUN #A is registered in the SBE 501, and the record at LBA 0x2800 of LUN #A is discarded from the SCT 401.

In a state in FIG. 15B, the I/O processing of anything other than the LUN and LBA that are registered in the BCT 601 is further performed, and an unoccupied area is not present in the SCT 401 and the SBE 501. Furthermore, starting LBA 0x2000 and ending LBA 0x2800 of LUN #C are registered, as pieces of data that are retained in the PFM 202, in the BCT 601. Furthermore, the I/O processing of the LUN and the LBA that are registered in the BCT 601 is performed, and a state in FIG. 15C is attained.

In a state in FIG. 15C, the host apparatus 102 makes a request for access to data that is stored in LBA 0x6000 to 0x6200 of stored LUN #D.

In this case, LBA 0x6000 of LUN #D is included in the LUN and the LBA that are registered in the BCE 701 (Yes in Step S905). For this reason, the storage control device 101 transfers the requested data from the PFM 202 to the DRAM 201 (Step S906). The storage control device 101 changes the record at LBA 0x6000 of LUN #D to the most recently used (MRU) record (Step S907). The storage control device 101 increases the number of times that the record at LBA 0x6000 of LUN #D has been accessed, by one (Step S908).

With the processing described above, the contents that are stored in the SCT 401, the SBE 501, the BCT 601, and the BCE 701 in FIG. 15D undergo transition. Specifically, the record at LBA 0x6000 of LUN #D is changed to the MRU record, and the number of times of access is 5.

In a state in FIG. 15D, the host apparatus 102 makes a request for access to data that is stored in LBA 0x2800 to 0x3000 of LUN #A.

In this case, LBA 0x2800 of LUN #D is not included in the LUN and the LBA that are registered in the BCE 701 (No in Step S905), and is included in the LUN and the LBA that are registered in the SBE 501 (Yes in Step S909). For this reason, the storage control device 101 transfers the requested data from the PFM 202 to the DRAM 201 (Step S910). The storage control device 101 changes the record including the address of the requested data to the most recently used (MRU) record (Step S911).

With the processing described above, the contents that are stored in the SCT 401, the SBE 501, the BCT 601, and the BCE 701 in FIG. 16A undergo transition. Specifically, the record at LBA 0x2800 of LUN #A is changed to the MRU record.

In a state in FIG. 16A, the I/O processing of anything other than the LUN and LBA that are registered in the BCT 601 is further performed from the host apparatus 102. With the I/O processing of these, the data at LBA 0x3000 of LUN #D is evicted from the DRAM 201.

In this case, LBA 0x3000 of LUN #D, which is discarded, is included in the LUN and the LBA that are registered in the SCT 401 (Yes in Step S1004). For this reason, the storage control device 101 increases the number of times that the record at LBA 0x3000 of LUN #D, which is discarded, is evicted, by one (Step S1005).

With the processing described above, the contents that are stored in the SCT 401, the SBE 501, the BCT 601, and the BCE 701 in FIG. 16B undergo transition. Specifically, the number of times that the record at LBA 0x3000 of LUN #D is evicted is 3.

In a state in FIG. 16B, the host apparatus 102 makes a request for access to data that is stored in LBA 0x3600 to 0x3800 of LUN #A. According to the embodiment, a predetermined number of times n is 2, and a predetermined value m is 3.

In this case, LBA 0x3600 of LUN #A is not included in the LUN and the LBA that are registered in the BCE 701 (No in Step S905), nor is it included in the LUN and the LBA that are registered in the SBE 501 (No in Step S909). For this reason, the storage control device 101 transfers data from LBA 0x3600 to 0x3800 of LUN #A to the DRAM 201 (Step S912).

In the data-deploying processing, LBA 0x3600 of LUN #A is registered in the BCT 601 (Yes in Step S1101), an unoccupied area is not present in the BCT 601 (No in Step S1102), and an unoccupied area is not present in the SBE 501 (No in Step S1103).

For this reason, the storage control device 101 sets the number of times that the LRU record is checked, to 1 (Step S1104). The number of times that the LRU record is checked is not 2 (No in Step S1105), and the number of times that the least recently used record at LBA 0x3000 of LUN #A, among the records of the BCE 701 has been accessed, that is, 2 is not equal to or greater than 3 (No in Step S1106).

For this reason, the storage control device 101 discards data from the area of the PFM 202, which is associated with LBA 0x3000 of LUN #A of the BCE 701 (Step S1107). Next, the storage control device 101 deletes the record at LBA 0x3000 of the LUN #A of the BCE 701 (Step S1108).

Thereafter, the storage control device 101 registers LBA 0x3600 of LUN #A in the BCE 701 (Step S1111). Next, the storage control device 101 transfers the data from LBA 0x3600 to 0x3800 of LUN #A to the PFM 202 (Step S1112). The storage control device 101 changes a record at LBA 0x3600 of LUN #A to the MRU record (Step S1113). Because the record at LBA 0x3600 of LUN #A that is registered in the BCE 701 is the first access, the storage control device 101 sets the number of times of access to 1 (Step S1114).

With the processing described above, the contents that are stored in the SCT 401, the SBE 501, the BCT 601, and the BCE 701 in FIG. 16C undergo transition. Specifically, the record at LBA 0x3000 of LUN #A of the BCE 701 is deleted, and the number of times that LBA 0x3600 of LUN #A has been accessed is registered as 1 in BCE 701.

In a state in FIG. 16C, the host apparatus 102 makes a request for access to data that is stored in LBA 0x2200 to 0x2400 of LUN #C.

In this case, LBA 0x2200 of LUN #C is not included in the LUN and the LBA that are registered in the BCE 701 (No in Step S905), nor is it included in the LUN and the LBA that are registered in the SBE 501 (No in Step S909). For this reason, the storage control device 101 transfers data from LBA 0x2200 to 0x2400 of LUN #C to the DRAM 201 (Step S912).

In the data-deploying processing, LBA 0x2200 of LUN #C is registered in the BCT 601 (Yes in Step S1101), an unoccupied area is not present in the BCE 701 (No in Step S1102), and an unoccupied area is not present in the SBE 501 (No in Step S1103).

For this reason, the storage control device 101 sets the number of times that the LRU record is checked, to 1 (Step S1104). The number of times that the LRU record is checked is not 2 (No in Step S1105), the number of times that the least recently used record at LBA 0x6800 of LUN #D, among the records of the BCE 701, has been accessed, that is, 3 is equal to or greater than a predetermined value 3 (Yes in Step S1106).

For this reason, the storage control device 101 changes a record at LBA 0x6800 of LUN #D to the most recently used (MRU) record (Step S1109). The storage control device 101 sets the number of times that the record at LBA 0x6800 of LUN #D that is changed to the MRU record has been accessed, to 1. Thereafter, the storage control device increases the number of times that the LRU record is checked, by one (Step S1110).

The number of times that the LRU record is checked is 2 (Yes in Step S1105). For this reason, the storage control device 101 discards the data from an area of the PFM 202, which is associated with the least recently used (LRU) record at LBA 0x1800 of LUN #B among the records of the SBE 501 (Step S1115). Next, the storage control device 101 deletes the record at LBA 0x1800 of the LUN #B of the SBE 501 (Step S1116).

The storage control device 101 registers an address of data in the SBE 501 (Step S1117). Next, the storage control device 101 transfers the data from LBA 0x2200 to 0x2400 of LUN #C to the PFM 202 (Step S1118).

Next, because a record at LBA 0x2200 of LUN #C of the SBE 501 is the most recently accessed (MRU) record, the storage control device 101 changes such a record to the MRU record (Step S1119).

With the processing described above, the contents that are stored in the SCT 401, the SBE 501, the BCT 601, and the BCE 701 in FIG. 16D undergo transition. Specifically, the record at LBA 0x1800 of LUN #B of the SBE 501 is deleted, and the record at LBA 0x2200 of LUN #C is registered in the SBE 501.

As described above, according to the present embodiment, the storage control device 101 stores an address on the storage device 103, of the data that is retained in the PFM 202, in the BCT 601, and stores in the BCE 701 an address on the storage device 103, of the data that is retained in the PFM 202. According to the request for access to data at an address that is included in the BCT 601, but is not included in the BCE 701, the storage control device 101 retains the data in the PFM 202 and registers the address of the data in the BCE 701.

Accordingly, the storage control device 101 can process the request for access to the data at the address stored in the BCE 701 with the data retained in the PFM 202. For this reason, the storage control device 101 can improve the response performance for the data that is designated by the user and that is frequently used without using the DRAM 201, by registering in the BCT 601 the address of the data that is frequently used by the user.

Furthermore, when the address of the data is registered in the BCE 701, in a case where the number of records that are included in the BCE 701 reaches an upper limit number, the storage control device 101 can delete the record that is included in the BCE 701. In this case, the storage control device 101 can delete the record that is used least recently and the number of times of access to which is smaller than a predetermined value m, among the records that are included in the BCE 701.

Accordingly, in the case where the number of records that are included in the BCE 701 reaches the upper limit number, the storage control device 101 can delete the record that is not frequently accessed among the records of the BCE 701.

Furthermore, the storage control device 101 can change the record that is used least recently and the number of times of access to which is at or above a predetermined value m, among the records that are included in the BCE 701, to the most recently used record, and can initialize the number of times of access.

Accordingly, the storage control device 101 can set the address of the data that is frequently accessed not to be eligible for deletion, with the data on the PFM 202. Furthermore, by initializing the number of times of access, the storage control device 101 makes it possible to completely delete the record, the number of times of access to which is equal to or greater than a predetermined value m.

Furthermore, the storage control device 101 can store the SCT 401 that includes the address on the storage device 103, of the data that is evicted from the DRAM 201, and the number of times of eviction. In a case where data that corresponds to the address which is included in the SCT 401 is evicted from the DRAM 201 and the number of times of eviction is equal to or greater than the threshold X, the storage control device 101 can retain the evicted data in the PFM 202. Furthermore, the storage control device 101 can register the address on the storage device 103, of the evicted data in the SBE 501.

Accordingly, the storage control device 101 can retain the data that is frequently evicted from the DRAM 201, in the PFM 202, and can process the request for access to the frequently-evicted data with the data retained in the PFM 202.

Furthermore, when the address of the data is registered in the BCE 701, in a case where the number of records that are included in the BCE 701 reaches the upper limit number and the number of records that are included in the SBE 501 does not reach the upper limit number, the storage control device 101 can register the address in the SBE 501.

Accordingly, even if the number of records that are included in the BCE 701 reaches the upper limit number, the storage control device 101 may not delete the record of the data that is registered in the BCE 701 and that is frequently used.

Furthermore, when the address of the data is registered in the BCE 701, in a case where the number of records that are included in the BCE 701 reaches the upper limit number and the number of records that are included in the SBE 501 reaches the upper limit number, the storage control device 101 can delete the record that is included in the BCE 701. In this case, the storage control device 101 can delete the record that is used least recently and the number of times of access to which is smaller than a predetermined value m, among the records that are included in the BCE 701.

Accordingly, in the case where the number of records that are included in each of the BCE 701 and the SBE 501 reaches the upper limit number, the storage control device 101 can delete the record that is not frequently accessed among the records of the BCE 701.

Furthermore, when the address of the data is registered in the BCE 701, in the case where the number of records that are included in the BCE 701 reaches the upper limit number and the number of records that are included in the SBE 501 reaches the upper limit number, the storage control device 101 may not delete the record that is included in the BCE 701. In this case, the storage control device 101 can delete the least recently used record of the SBE 501 without deleting the record that is least recently used and the number of times of access to which is equal to or greater than a predetermined value m, among the records that are included in the BCE 701.

Accordingly, by deleting the least recently used record of the SBE 501, the storage control device 101 may not delete the record of the data that is registered in the SBE 501 and that is frequently used.

Furthermore, in a case where the usage ratio of the BCE 701 is equal to or greater than the first predetermined value N1, the storage control device 101 can increase the threshold X. Accordingly, when the number of unoccupied areas is increased in the SBE 501 and the address that is difficult to register in the BCE 701 is registered in the SBE 501, the data at the address that is registered in the BCT 601 can be retained in the PFM 202.

Furthermore, in a case where the usage ratio of the BCE 701 is equal to or smaller than the second predetermined value N2, the storage control device 101 can decrease the threshold X. Accordingly, the number of unoccupied areas in the SBE 501 can be decreased, and the data at the address that is registered the SCT 401 can be retained in the PFM 202.

Moreover, the storage control program according to the present embodiment, which is described above, can be realized by causing a computer such as a personal computer or a workstation to execute a program that is prepared in advance. The present storage control program is recorded on a computer-readable recording medium such as hard disk, a flexible disk, a CD-ROM, a MO, or a DVD, and is read by the computer from the recording medium for execution. Furthermore, the present storage control program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A device that controls access to a storage device, the device comprising:
   a first cache memory;
   a second cache memory; and
   a processor coupled to the first cache memory and the second cache memory, and configured to
     store data in the second cache memory, the data being deleted from the first cache memory,
     store first data stored in a first address of the storage device, in the second cache memory, in a case where the first address is included in first management information and is not included in second management information, according to a request for access to the first address of the storage device, the first management information including an address in the storage device of specific data stored in the storage device, and the second management information including an address in the storage device of data stored in both of the second cache memory and the storage device,
     register the first address in the second management information,
     based on number information indicating number of times that the data stored in the second cache memory is accessed, delete an address that has been least recently accessed and number of times of access to which is smaller than a first predetermined value from the second management information among multiple addresses that are included in the second management information in a case where the number of addresses that are included in the second management information reaches a first upper limit value,
     delete data corresponding to the deleted address from the second cache memory,
     change an attribute of an address that has been least recently accessed and the number of times of access to which is equal to or greater than the first predetermined value, among the multiple addresses that are included in the second management information, to an attribute of an address that is recently accessed, and
     initialize the number of times of access.

2. The device according to claim 1,
   wherein the processor is configured to read the first data from the second cache memory or write the first data to the second cache memory, according to the request for access, in a case where the first address is included in the second management information.

3. The device according to claim 1,
   wherein the processor is configured to store the deleted data in the second cache memory and register an address on the storage device, of the deleted data, in fourth management information, in a case where number of times indicated by third management information is equal to or greater than a second predetermined value, according to deletion of data corresponding to an address being included in the third management information from the first cache memory, the third management information including an address on the storage device, of data that is deleted from the first cache memory and the number of times of deletion.

4. The device according to claim 3,
wherein the processor is configured to read the first data corresponding to the first address from the second cache memory or write the first data corresponding to the first address to the second cache memory in a case where the first address is not included in the second management information and is included in the fourth management information.

5. The device according to claim 3,
wherein the processor is configured to store the first data corresponding to the first address in the second cache memory and register the first address in the fourth management information, in a case where the number of addresses that are registered in the second management information reaches the first upper limit value and the number of times that an address which has been least recently accessed is accessed is equal to or greater than the first predetermined value, among multiple addresses that are registered in the second management information, when the first data corresponding to the first address is stored in the second cache memory.

6. The device according to claim 3,
wherein the processor is configured to delete the address that has been least recently accessed from the fourth management information and delete data corresponding to the deleted address from the second cache memory, among multiple addresses that are included in the fourth management information, in a case where the number of addresses that are included in the second management information reaches the first upper limit value and the number of addresses that are included in the fourth management information reaches a second upper limit value, when the first data corresponding to the first address is stored in the second cache memory.

7. The device according to claim 3,
wherein the processor is configured to calculate a ratio of the number of addresses being included in the second management information to the first upper limit value and change the second predetermined value according to the calculated ratio.

8. The device according to claim 1,
wherein an address that is designated by a user is registered in the first management information.

9. A method of controlling access to a storage device using a first cache memory and a second cache memory, the method comprising:
storing data in the second cache memory, the data being deleted from the first cache memory;
receiving a request for access to a first address of the storage device;
determining whether or not the first address is included in the first management information, based on first management information that includes an address on the storage device, of specific data among pieces of data that are stored in the storage device;
determining whether or not the first address is included in second management information, based on the second management information that includes an address on the storage device, of data that is stored also in the second cache memory among the pieces of data that are stored in the storage device;
storing first data that is stored in the first address of the storage device, in the second cache memory, in a case where it is determined that the first address is included in the first management information and is not included in the second management information;
holding number information indicating the number of times that the data stored in the second cache memory is accessed;
deleting, from the second management information, an address that has been least recently accessed, and the number of times of access to which is smaller than a first predetermined value, among multiple addresses that are included in the second management information in a case where the number of addresses that are included in the second management information reaches a first upper limit value;
deleting data corresponding to the deleted address from the second cache memory;
changing an attribute of an address that has been least recently accessed and the number of times of access to which is equal to or greater than the first predetermined value, among the multiple addresses that are included in the second management information, to an attribute of an address that is recently accessed; and
initializing the number of times of access.

10. The method according to claim 9, further comprising:
reading the first data from the second cache memory or write the first data to the second cache memory, according to the request for access, in a case where the first address is included in the second management information.

11. The method according to claim 9, further comprising:
holding third management information that includes an address on the storage device, of data that is deleted from the first cache memory and the number of times of deletion; and
storing the deleted data in the second cache memory and register an address on the storage device, of the deleted data, in the fourth management information, in a case where the number of times that the deleted data has been deleted is equal to or greater than a second predetermined value, according to deletion of data corresponding to an address being included in the third management information from the first cache memory.

12. The method according to claim 11, further comprising:
reading the first data corresponding to the first address from the second cache memory or write the first data corresponding to the first address to the second cache memory in a case where the first address is not included in the second management information and is included in the fourth management information.

13. The method according to claim 11, further comprising:
storing the first data corresponding to the first address in the second cache memory and register the first address in the fourth management information, in a case where the number of addresses that are registered in the second management information reaches the first upper limit value and the number of times that an address which has been least recently accessed is accessed is equal to or greater than the first predetermined value, among multiple addresses that are registered in the second management information, when the first data corresponding to the first address is stored in the second cache memory.

14. The method according to claim 11, further comprising:
deleting the address that has been least recently accessed from the fourth management information and delete data corresponding to the deleted address from the second cache memory, among multiple addresses that are included in the fourth management information, in a case where the number of addresses that are included in the second management information reaches the first upper limit value and the number of addresses that are included in the fourth management information reaches a second upper limit value, when the first data corresponding to the first address is stored in the second cache memory.

15. The method according to claim 11, further comprising:
calculating a ratio of the number of addresses being included in the second management information to the first upper limit value and change the second predetermined value according to the calculated ratio.

16. The method according to claim 9, wherein an address that is designated by a user is registered in the first management information.

* * * * *